(12) United States Patent
Yamauchi

(10) Patent No.: US 10,664,957 B2
(45) Date of Patent: May 26, 2020

(54) IMAGE PROJECTION SYSTEM AND CONTROL METHOD FOR IMAGE PROJECTION SYSTEM

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/119,588

(22) Filed: Aug. 31, 2018

(65) Prior Publication Data

US 2019/0073753 A1    Mar. 7, 2019

(30) Foreign Application Priority Data

Sep. 1, 2017  (JP) ................................ 2017-168291

(51) Int. Cl.
| | |
|---|---|
| *G06T 5/00* | (2006.01) |
| *G06T 7/73* | (2017.01) |
| *H04N 9/31* | (2006.01) |
| *H04N 9/00* | (2006.01) |
| *G06T 3/00* | (2006.01) |

(52) U.S. Cl.
CPC .............. *G06T 5/006* (2013.01); *G06T 3/005* (2013.01); *G06T 7/73* (2017.01); *H04N 9/00* (2013.01); *H04N 9/3185* (2013.01); *H04N 9/3188* (2013.01); *H04N 9/3194* (2013.01); *G06T 2207/10024* (2013.01)

(58) Field of Classification Search
CPC .......... G06T 5/006; G06T 7/73; G06T 3/005; G06T 2207/10024; H04N 9/3185; H04N 9/3194; H04N 9/3188; G06K 9/4604
See application file for complete search history.

(56) References Cited

U.S. PATENT DOCUMENTS

| | | | |
|---|---|---|---|
| 2007/0091334 A1 | 4/2007 | Yamaguchi et al. | |
| 2013/0108104 A1* | 5/2013 | Sonoda | B25J 9/1612 382/103 |
| 2015/0189267 A1* | 7/2015 | Kaji | G06T 7/80 348/187 |

(Continued)

FOREIGN PATENT DOCUMENTS

| | | |
|---|---|---|
| JP | 2001-83949 A | 3/2001 |
| JP | 2005-20314 A | 1/2005 |

(Continued)

*Primary Examiner* — Jin Cheng Wang
(74) *Attorney, Agent, or Firm* — Oliff PLC

(57) ABSTRACT

An image projection system includes an image projecting section configured to project an image onto a projection surface, a control section configured to cause the image projecting section to project a pattern image, an imaging section configured to capture the pattern image projected on the projection surface, a detecting section configured to detect a plurality of reference points on the basis of the pattern image captured by the imaging section, and an image-information correcting section configured to correct, on the basis of positions of the reference points detected by the detecting section, the image projected by the projecting section. The pattern image includes a plurality of unit patterns for specifying the reference points. The plurality of unit patterns include unit patterns of seven colors.

12 Claims, 17 Drawing Sheets

(56) References Cited

U.S. PATENT DOCUMENTS

| | | | |
|---|---|---|---|
| 2015/0304617 A1* | 10/2015 | Chang | H04N 9/3185 |
| | | | 348/189 |
| 2016/0182873 A1* | 6/2016 | Sumiyoshi | H04N 9/3185 |
| | | | 348/747 |
| 2016/0295184 A1* | 10/2016 | Ishikawa | H04N 9/3185 |
| 2016/0353068 A1* | 12/2016 | Ishikawa | H04N 9/3147 |
| 2017/0142381 A1* | 5/2017 | Kaji | G06T 7/70 |
| 2017/0186146 A1* | 6/2017 | Raniwala | G06T 7/521 |
| 2018/0007329 A1 | 1/2018 | Tanaka et al. | |
| 2018/0241978 A1* | 8/2018 | Hirota | H04N 5/74 |
| 2018/0324396 A1* | 11/2018 | Ishikawa | G03B 21/00 |
| 2018/0356213 A1* | 12/2018 | Zheng | G01B 11/2545 |
| 2018/0364032 A1* | 12/2018 | Katsuki | G01B 11/25 |
| 2019/0005607 A1* | 1/2019 | Tamai | G03B 21/00 |
| 2019/0028685 A1* | 1/2019 | Kaji | G06T 7/74 |

FOREIGN PATENT DOCUMENTS

| | | |
|---|---|---|
| JP | 2009-42690 A | 2/2009 |
| JP | 2011-238370 A | 11/2011 |
| JP | 2016178448 A | 10/2016 |

\* cited by examiner

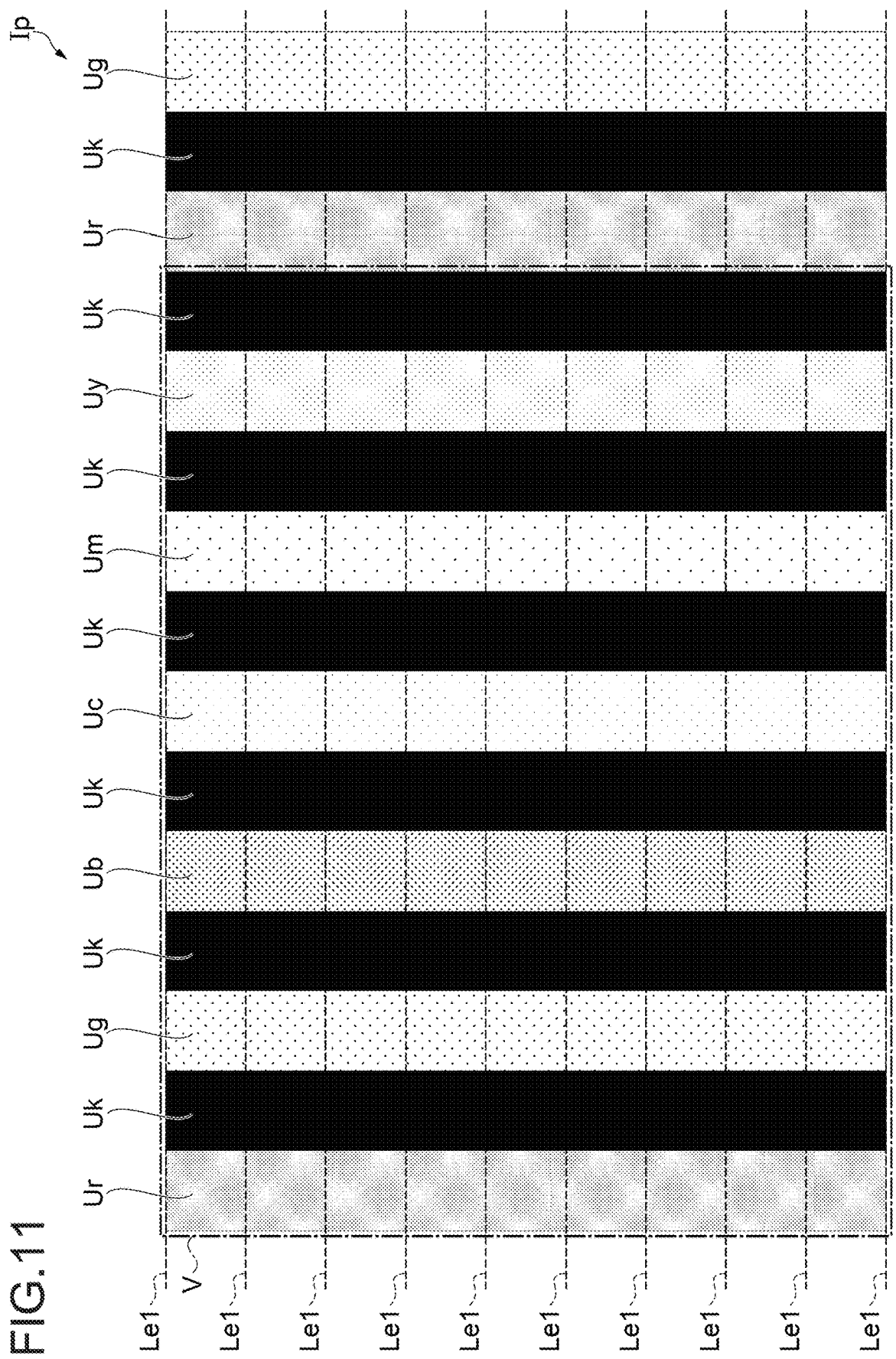

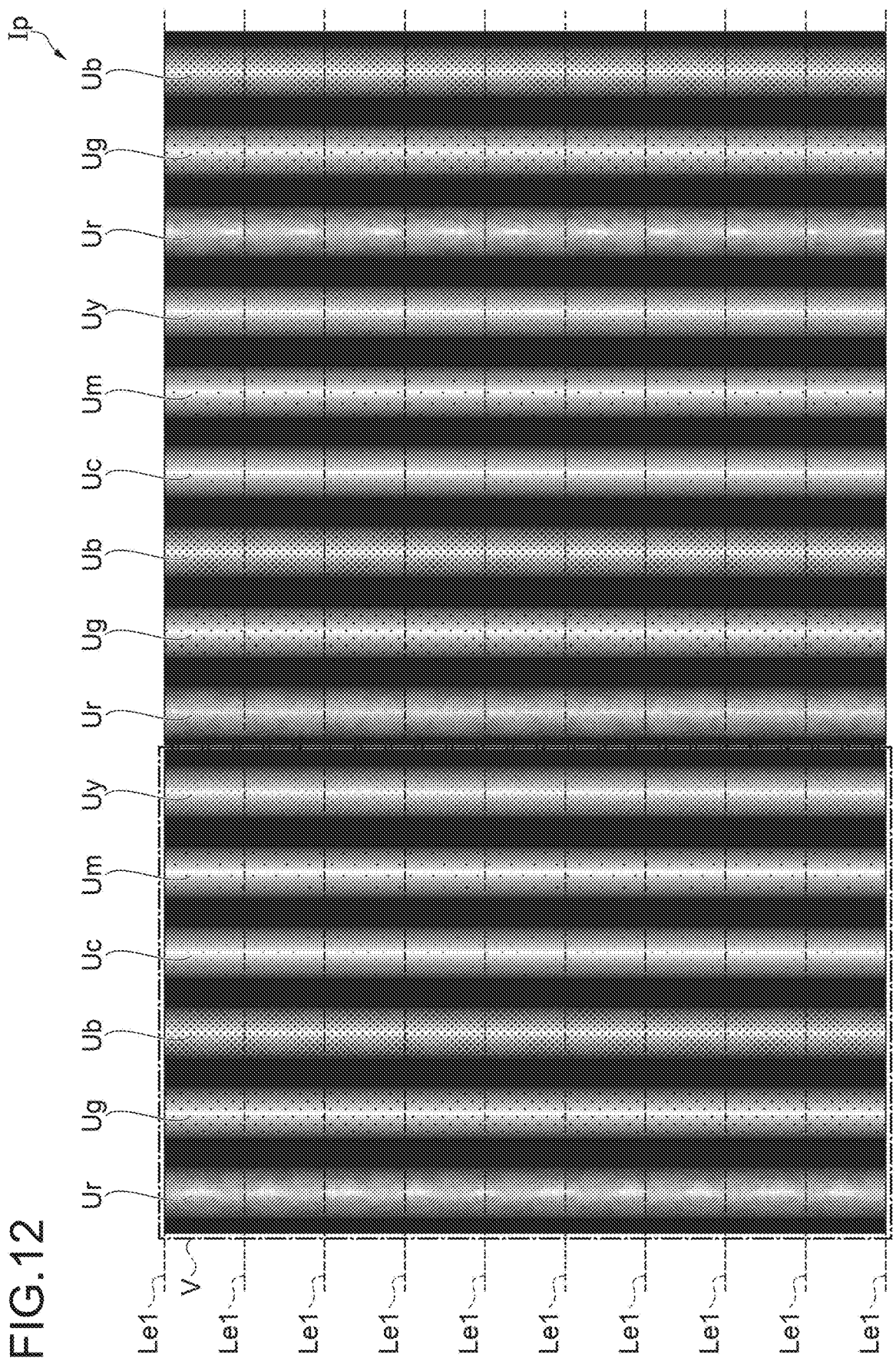

IMAGE PROJECTION SYSTEM AND CONTROL METHOD FOR IMAGE PROJECTION SYSTEM

BACKGROUND

1. Technical Field

The present invention relates to an image projection system that projects an image onto a projection surface and a control method for the image projection system.

2. Related Art

There has been proposed a technique for, in a system that projects an image onto a projection surface, which is not a simple plane, that is, a projection surface having a three-dimensional shape, projecting a predetermined pattern image onto the projection surface from a projector and capturing the predetermined pattern image with a camera to thereby correct distortion of an image due to the three-dimensional shape of the projection surface (see, for example, JP-A-2016-178448 (Patent Literature 1)). In the projection system described in Patent Literature 1, a lattice-like pattern image on which white rectangular patterns and black rectangular patterns are regularly arrayed is used.

However, because a parallax is present between the projector and the camera, when relatively large unevenness is present on the projection surface, a part of the pattern image cannot be captured by the camera and correct correction cannot be performed. In particular, in a form in which correction is performed on the basis of the positions of a plurality of reference points (e.g., intersections of a lattice), if a part of the reference points cannot be detected, a correspondence relation between detected reference points and original positions (positions on the pattern image) of the detected reference points is unclear. Therefore, correct correction cannot be performed in the entire image. Even if the projection surface is a plane, when a part of the reference points cannot be detected because of a pattern or a stain on the projection surface, an obstacle, or the like, the same problem could occur.

SUMMARY

An advantage of some aspects of the invention is to solve at least a part of the problems described above, and the invention can be implemented as the following forms or application examples.

Application Example 1

An image projection system according to this application example includes: a projecting section configured to project an image onto a projection surface; a control section configured to cause the projecting section to project a pattern image; an imaging section configured to capture the pattern image projected on the projection surface; a detecting section configured to detect reference points on the basis of the pattern image captured by the imaging section; and a correcting section configured to correct, on the basis of positions of the reference points detected by the detecting section, the image projected by the projecting section. The pattern image includes a plurality of unit patterns for specifying the reference points. The plurality of unit patterns include at least three types unit patterns which at least one of colors and patterns are different.

With the image projection system, because the pattern image includes unit patterns of at least the three types, at least one of the colors and the patterns of which are different, it is possible to increase an interval of arrangement of unit patterns of the same type compared with when unit patterns of two types like a white rectangular pattern and a black rectangular pattern are used. Therefore, even when a part of the reference points are not detected by the detecting section, it is possible to identify the detected reference points on the basis of the colors and the patterns of the unit patterns. As a result, a correspondence relation between the positions of the detected reference points and original positions (positions on the pattern image) of the detected reference points is clarified. Therefore, it is possible to appropriately correct the image.

Application Example 2

In the image projection system according to the application example, the at least three types unit patterns may have colors different from one another.

With the image projection system, even when a part of the reference points are not detected by the detecting section, it is possible to identify the detected reference points on the basis of the colors of the unit patterns.

Application Example 3

In the image projection system according to the application example, the at least three types unit patterns may have patterns different from one another.

With the image projection system, even when a part of the reference points are not detected by the detecting section, it is possible to identify the detected reference points on the basis of the patterns of the unit patterns.

Application Example 4

In the image projection system according to the application example, the unit patterns are patterns of a shape having vertexes, and the detecting section may detect the vertexes of the unit patterns as the reference points.

With the image projection system, because the detecting section detects the vertexes of the unit patterns as the reference points, it is possible to easily detect the reference points.

Application Example 5

In the image projection system according to the application example, the unit patterns may be patterns having luminance distributions, and the detecting section may detect the reference points on the basis of luminance of the unit patterns.

With the image projection system, because the reference points are detected on the basis of the luminance of the unit patterns, it is possible to accurately detect the reference points.

Application Example 6

In the image projection system according to the application example, the pattern image may include a plurality of basic pattern groups in which the at least three types unit patterns are arranged in a predetermined array.

With the image projection system, because the pattern image is configured by the plurality of basic pattern groups, it is possible to reduce necessary types (colors and patterns) of the unit patterns. It is easy to identify the unit patterns.

Application Example 7

In the image projection system according to the application example, in the pattern image, the unit patterns may be arranged such that the reference points are located along a first epipolar line determined on the basis of a disposition relation between the projecting section and the imaging section, and the detecting section may detect, from the image captured by the imaging section, the reference points along a second epipolar line corresponding to the first epipolar line.

With the image projection system, because the detecting section is capable of detecting the reference points along the second epipolar line, it is easy to detect the reference points.

Application Example 8

In the image projection system according to the application example, the unit patterns may be belt-like patterns extending in a direction crossing a first epipolar line determined on the basis of a disposition relation between the projecting section and the imaging section, and the detecting section may detect, from the image captured by the imaging section, the reference points along a second epipolar line corresponding to the first epipolar line.

With the image projection system, because the detecting section is capable of detecting the reference points along the second epipolar line, it is easy to detect the reference points.

Application Example 9

In the image projection system according to the application example, the detecting section may detect end portions of the unit patterns as the reference points.

With the image projection system, because the detecting section detects the end portions of the unit patterns as reference points, it is possible to easily detect the reference points.

Application Example 10

In the image projection system according to the application example, the unit patterns may be patterns having luminance distributions, and the detecting section may detect the reference points on the basis of luminance of the unit patterns.

With the image projection system, because the reference points are detected on the basis of the luminance of the unit patterns, it is possible to accurately detect the reference points.

Application Example 11

In the image projection system according to the application example, the projecting section and the imaging section may be integrally configured.

With the image projection system, because the projecting section and the imaging section are integrally configured, it is unnecessary to adjust disposition of the projecting section and the imaging section every time.

Application Example 12

A control method for an image projection system according to this application example includes: projecting a pattern image from a projecting section configured to project an image onto a projection surface; capturing the pattern image projected on the projection surface; detecting reference points on the basis of the captured pattern image; and correcting, on the basis of positions of the detected reference points, the image projected by the projecting section. The pattern image includes a plurality of unit patterns for specifying the reference points. The plurality of unit patterns include at least three types unit patterns which at least one of colors and patterns are different.

With the control method for the image projection system, because the pattern image includes unit patterns of at least the three types, at least one of the colors and the patterns of which are different, it is possible to increase an interval of arrangement of unit patterns of the same type compared with when unit patterns of two types such as a white rectangular pattern and a black rectangular pattern are used. Therefore, even when a part of the reference points are not detected by the detecting section, it is possible to identify the detected reference points on the basis of the colors and the patterns of the unit patterns. As a result, a correspondence relation between the positions of the detected reference points and original positions (positions on the pattern image) of the detected reference points is clarified. Therefore, it is possible to appropriately correct the image.

BRIEF DESCRIPTION OF THE DRAWINGS

The invention will be described with reference to the accompanying drawings, wherein like numbers reference like elements.

FIG. 11 is a diagram showing a pattern image in a fifth embodiment.

FIG. 12 is a diagram showing a pattern image in a sixth embodiment.

DESCRIPTION OF EXEMPLARY EMBODIMENTS

First Embodiment

A projector in a first embodiment is explained below with reference to the drawings.

Figure 1:
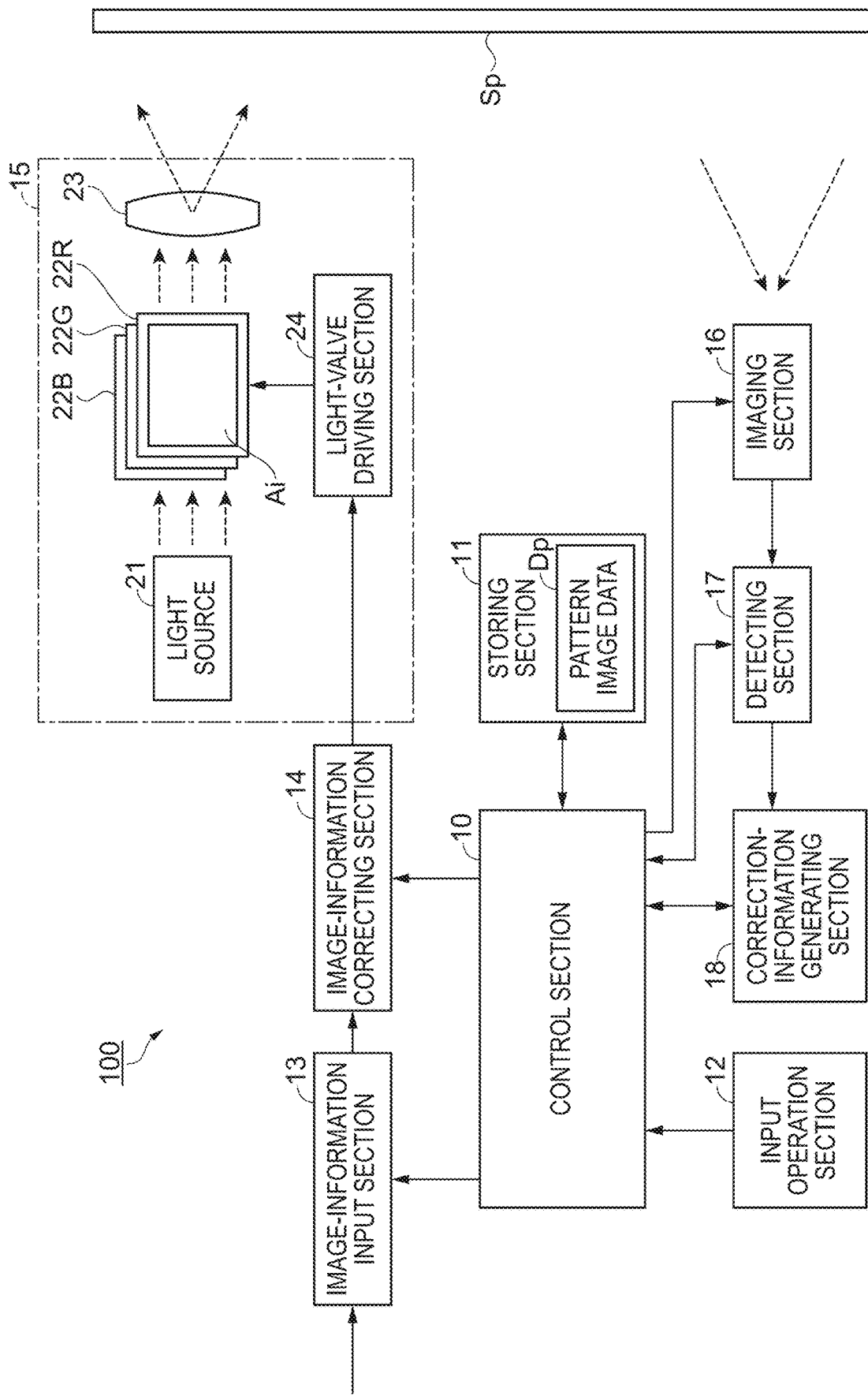
FIG. 1 is a block diagram showing a schematic configuration of a projector.

FIG. 1 is a block diagram showing a schematic configuration of a projector 100 in this embodiment.

As shown in FIG. 1, the projector 100 functioning as an image projection system integrally includes a control section 10, a storing section 11, an input operation section 12, an image-information input section 13, an image-information correcting section 14 functioning as a correcting section, an image projecting section 15 functioning as a projecting section, an imaging section 16, a detecting section 17, and a correction-information generating section 18. The projector 100 projects an image from the image projecting section 15 onto a projection surface Sp on the basis of image information input to the image-information input section 13.

The projector 100 in this embodiment is capable of correcting distortion of an image that occurs when the image is projected onto the projection surface Sp from an oblique direction and correcting distortion of an image that occurs when the image is projected onto the projection surface Sp of a three-dimensional shape having unevenness on the surface. Specifically, the projector 100 projects a predetermined pattern image Ip (see FIG. 2) from the image projecting section 15 onto the projection surface Sp and captures the pattern image Ip with the imaging section 16 to thereby recognize distortion of an image and generates correction information for correcting the distortion. Thereafter, the projector 100 applies correction processing based on the generated correction information on an image that should originally be displayed, that is, an image that should be displayed in a state in which the distortion is corrected (this image is hereinafter referred to as "display image" as well) and projects an image after the processing onto the projection surface Sp.

The control section 10 includes one or a plurality of processors. The control section 10 operates according to a control program stored in the storing section 11 to thereby collectively control the operation of the projector 100.

The storing section 11 includes a RAM (Random Access Memory), which is a volatile memory, and a ROM (Read Only Memory), which is a nonvolatile memory. The RAM is used for temporary storage of various data and the like. The ROM stores a control program, control data, and the like for controlling the operation of the projector 100. The storing section 11 in this embodiment has stored therein image data (pattern image data Dp) corresponding to a pattern image Ip for correcting distortion of an image. The storing section 11 may have stored therein image data for a display image.

The input operation section 12 includes a plurality of operation keys with which a user gives various instructions to the projector 100. As the operation keys included in the input operation section 12, there are, for example, a "power key" for switching ON and OFF of a power supply, a "menu key" for displaying a setting menu for performing various kinds of setting, and a "direction key" for selecting an item of the setting menu. When the user operates the various operation keys of the input operation section 12, the input operation section 12 outputs an operation signal corresponding to operation content of the user to the control section 10. Note that a remotely controllable remote controller (not shown in FIG. 1) may be used as the input operation section 12. In this case, the remote controller transmits an operation signal of an infrared ray corresponding to the operation content of the user. A not-shown remote-controller-signal receiving section receives the operation signal and communicates the operation signal to the control section 10.

The image-information input section 13 is connected to an external image supply apparatus (not shown in FIG. 1) such as a computer or an image reproducing apparatus. The image-information input section 13 receives supply of image information for a display image from the image supply apparatus. The image-information input section 13 can receive, from the control section 10, supply of image information (the pattern image data Dp and the image data for a display image) stored in the storing section 11. The image-information input section 13 applies, on the basis of the control by the control section 10, various kinds of processing (e.g., resolution conversion processing and image quality adjustment processing) according to necessity to the image information input from the image supply apparatus or the control section 10 and outputs the image information after the processing to the image-information correcting section 14.

The image-information correcting section 14 corrects, on the basis of the control by the control section 10, distortion of an image due to projection from an oblique direction and distortion of an image due to unevenness and the like of the projection surface Sp. Specifically, the image-information correcting section 14 applies correction processing based on correction information input from the control section 10 to the image information input from the image-information input section 13 and outputs the image information after the processing to a light-valve driving section 24 of the image projecting section 15.

The image projecting section 15 is configured by a light source 21, three liquid crystal light valves 22R, 22G, and 22B functioning as light modulating devices, a projection lens 23 functioning as a projection optical system, a light-valve driving section 24, and the like. The image projecting section 15 modulates light emitted from the light source 21 with the liquid crystal light valves 22R, 22G, and 22B to form image light and projects the image light from the projection lens 23 to display an image on the projection surface Sp.

The light source 21 includes a light source lamp of a discharge type such as an ultra-high pressure mercury lamp or a metal halide lamp or a solid state light source such as a light emitting diode or a semiconductor laser. The light emitted from the light source 21 is converted into light having a substantially uniform luminance distribution by a not-shown integrator optical system and separated into color light components of red (R), green (G), and blue (B), which are the three primary colors of light, by a not-shown color separation optical system. Thereafter, the color light components are respectively made incident on the liquid crystal light valves 22R, 22G, and 22B.

The liquid crystal light valves 22R, 22G, and 22B are configured by, for example, liquid crystal panels of a transmission type, in each of which liquid crystal is encapsulated between a pair of transparent substrates. In the liquid crystal panels, rectangular image forming regions Ai formed by pluralities of pixels arrayed in a matrix shape are formed. It is possible to apply a driving voltage to the liquid crystal for each of the pixels.

The light-valve driving section 24 forms images in the image forming regions Ai of the liquid crystal light valves 22R, 22G, and 22B. Specifically, the light-valve driving section 24 applies a driving voltage corresponding to the image information input from the image-information correcting section 14 to the pixels of the image forming regions Ai and sets the pixels to light transmittance corresponding to the image information. The light emitted from the light source 21 is transmitted through the image forming regions Ai of the liquid crystal light valves 22R, 22G, and 22B to thereby be modulated for each of the pixels. Image light corresponding to the image information is formed for each of the color lights. The formed color image lights are combined for each of the pixels by a not-shown color combination optical system to be image light representing a color image. The image light is enlarged and projected onto the projection surface Sp by the projection lens 23. As a result, an image based on the image information is displayed on the projection surface Sp.

The imaging section 16 is a camera including an imaging device (not shown in FIG. 1) such as a CCD (Charge Coupled Device) sensor or a CMOS (Complementary Metal Oxide Semiconductor) sensor. The imaging section 16 captures, on the basis of the control by the control section 10, the pattern image Ip projected on the projection surface Sp and outputs image information (captured image information), which is a result of the capturing, to the detecting section 17.

The detecting section 17 operates according to the control by the control section 10 and detects, on the basis of the captured image information input from the imaging section 16, from the captured pattern image Ip, a plurality of reference points for correcting distortion of an image. Specifically, the detecting section 17 detects, as reference points, vertexes of a plurality of rectangular unit patterns included in the pattern image Ip. At this time, the detecting section 17 can distinguish colors of the unit patterns and generate, on the basis of the distinguished colors of the unit patterns, identification information for identifying the reference points. The detecting section 17 outputs coordinates of the reference points on the image (the captured image) based on the captured image information and the generated identification information to the correction-information generating section 18.

The correction-information generating section 18 operates according to the control by the control section 10 and recognizes distortion of the image based on the coordinates of the reference points and the identification information input from the detecting section 17. The correction-information generating section 18 generates, on the basis of the control by the control section 10, correction information for correcting the recognized distortion of the image and outputs the generated correction information to the control section 10.

Note that the image-information input section 13, the image-information correcting section 14, the detecting section 17, and the correction-information generating section 18 may be configured by one or a plurality of processors and the like or may be configured by a dedicated processing device such as an ASIC (Application Specific Integrated Circuit) or an FPGA (Field Programmable Gate Array).

Figure 2:
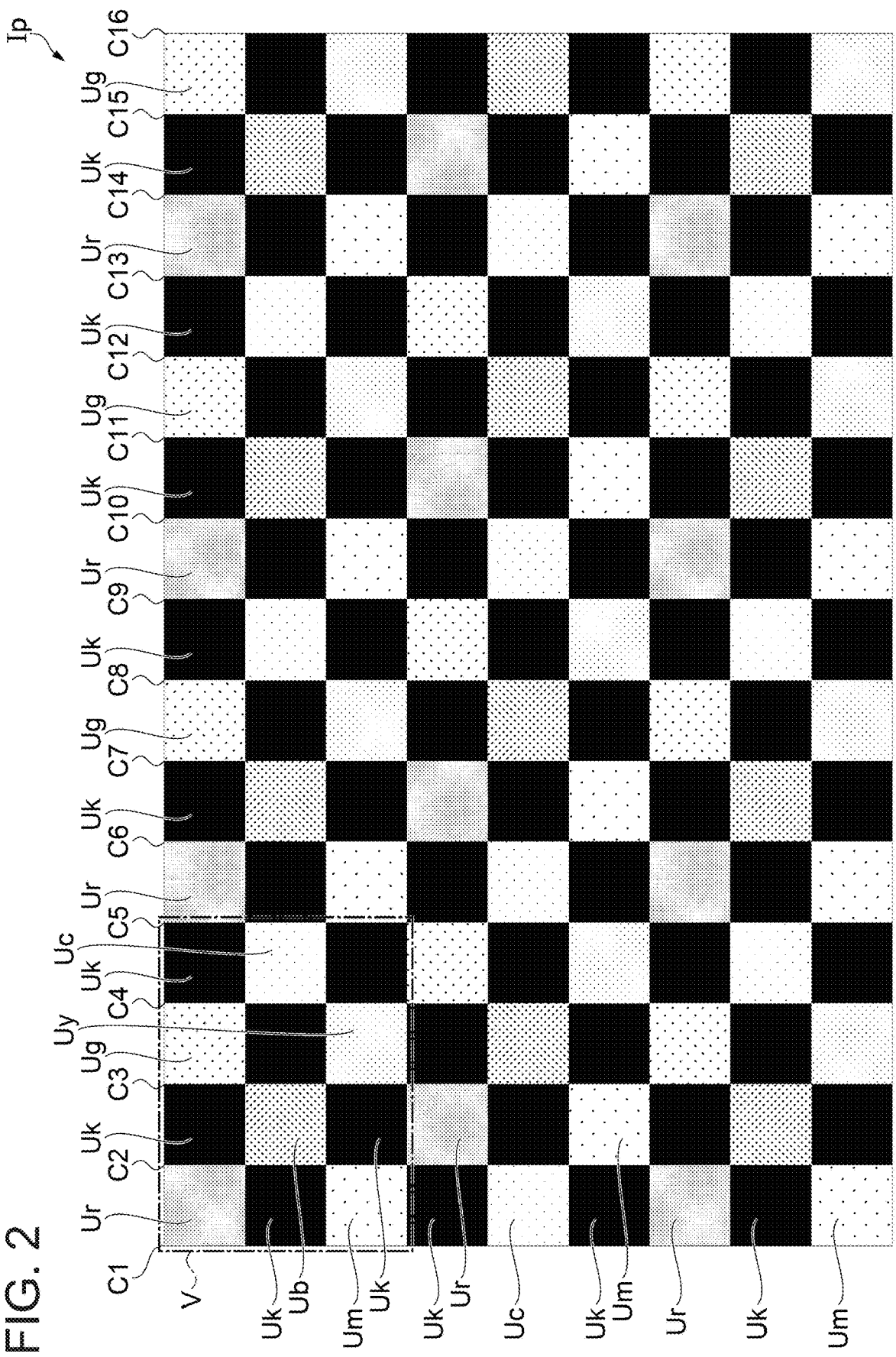
FIG. 2 is a diagram showing a pattern image for correcting distortion of an image.

FIG. 2 is a diagram showing an image based on the pattern image Ip for correcting distortion of an image, that is, the pattern image data Dp stored in the storing section 11.

As shown in FIG. 2, the pattern image Ip is a rectangular image formed in the image forming region Ai and is an image on which a plurality of unit patterns Ur, Ug, Uc, Um, Uy, and Uk having different colors (wavelength regions) are arrayed in a 15×9 matrix shape. Specifically, the pattern image Ip includes unit patterns of seven colors, that is, red unit patterns Ur, green unit patterns Ug, blue unit patterns Ub, cyan unit patterns Uc, magenta unit patterns Um, yellow unit patterns Uy, and black unit patterns Uk. All of shapes of the unit patterns are rectangular (in this embodiment, square). Note that, in the following explanation, the unit patterns are collectively referred to as "unit patterns U" as well.

The color (red) of the unit patterns Ur is a color obtained by maximizing the light transmittance of the liquid crystal light valve 22R for red light and minimizing the light transmittance of the liquid crystal light valves 22G and 22B for green light and blue light. The color (green) of the unit patterns Ug is a color obtained by maximizing the light transmittance of the liquid crystal light valve 22G for green light and minimizing the light transmittance of the liquid crystal light valves 22R and 22B for red light and blue light. The color (blue) of the unit patterns Ub is a color obtained by maximizing the light transmittance of the liquid crystal light valve 22B for blue light and minimizing the light transmittance of the liquid crystal light valves 22R and 22G for red light and green light. The color (cyan) of the unit patterns Uc is a color obtained by maximizing the transmittance of the liquid crystal light valves 22G and 22B for green light and blue light and minimizing the light transmittance of the liquid crystal light valve 22R for red light. The color (magenta) of the unit patterns Um is a color obtained by maximizing the light transmittance of the liquid crystal light valves 22R and 22B for red light and blue light and minimizing the light transmittance of the liquid crystal light valve 22G for green light. The color (yellow) of the unit patterns Uy is a color obtained by maximizing the light transmittance of the liquid crystal light valves 22R and 22G for red light and green light and minimizing the light transmittance of the liquid crystal light valve 22B for blue light. The color (black) of the unit patterns Uk is a color obtained by minimizing the light transmittance of the liquid crystal light valves 22R, 22G, and 22B for red light, green light, and blue light.

In this embodiment, the detecting section 17 of the projector 100 detects, from the pattern image Ip captured by the imaging section 16, as reference points, vertexes (corners) of the unit patterns U of six colors excluding the black unit patterns Uk. Therefore, in the following explanation, the unit patterns U of the six colors other than the black unit patterns Uk are referred to as "unit patterns for detection U" as well. The unit patterns for detection U are arranged in a checkered pattern not to be adjacent to one another in a longitudinal direction and a lateral direction. The black unit patterns Uk are arranged in positions other than positions where the unit patterns for detection U are arranged. That is, the black unit patterns Uk are patterns functioning as backgrounds of the unit patterns for detection U. The pattern image Ip can also be regarded as a lattice-like image formed by contour lines of the unit patterns U. In this case, intersections of a lattice are reference points. Note that the pattern image Ip shown in FIG. 2 includes 16×10 (160) reference points arrayed in a matrix shape. Among the reference points, reference signs are attached to only sixteen reference points in the top row (reference points C1 to C16 in order from the left).

In FIG. 2, twelve unit patterns U are arranged in a 4×3 matrix shape in a rectangular range indicated by an alternate long and short dash line. In the following explanation, a set of the twelve unit patterns U is referred to as "basic pattern group V". In the basic pattern group V, the unit patterns for detection U, one each of which is for each of the colors, are arranged in a predetermined array. Six black unit patterns Uk are arranged to be adjacent to the unit patterns for detection U. The pattern image Ip is an image including a plurality of basic pattern groups V. In other words, the pattern image Ip is a part of an image on which a plurality of the same basic pattern groups V are arrayed longitudinally and laterally. Note that, in the pattern image Ip shown in FIG. 2, the basic pattern groups V are repeatedly arrayed in the lateral direction and the basic pattern groups V adjacent to one another in the longitudinal direction are arranged to be shifted by one column (by one unit pattern U).

The operation of the projector 100 is explained.

Figure 3:
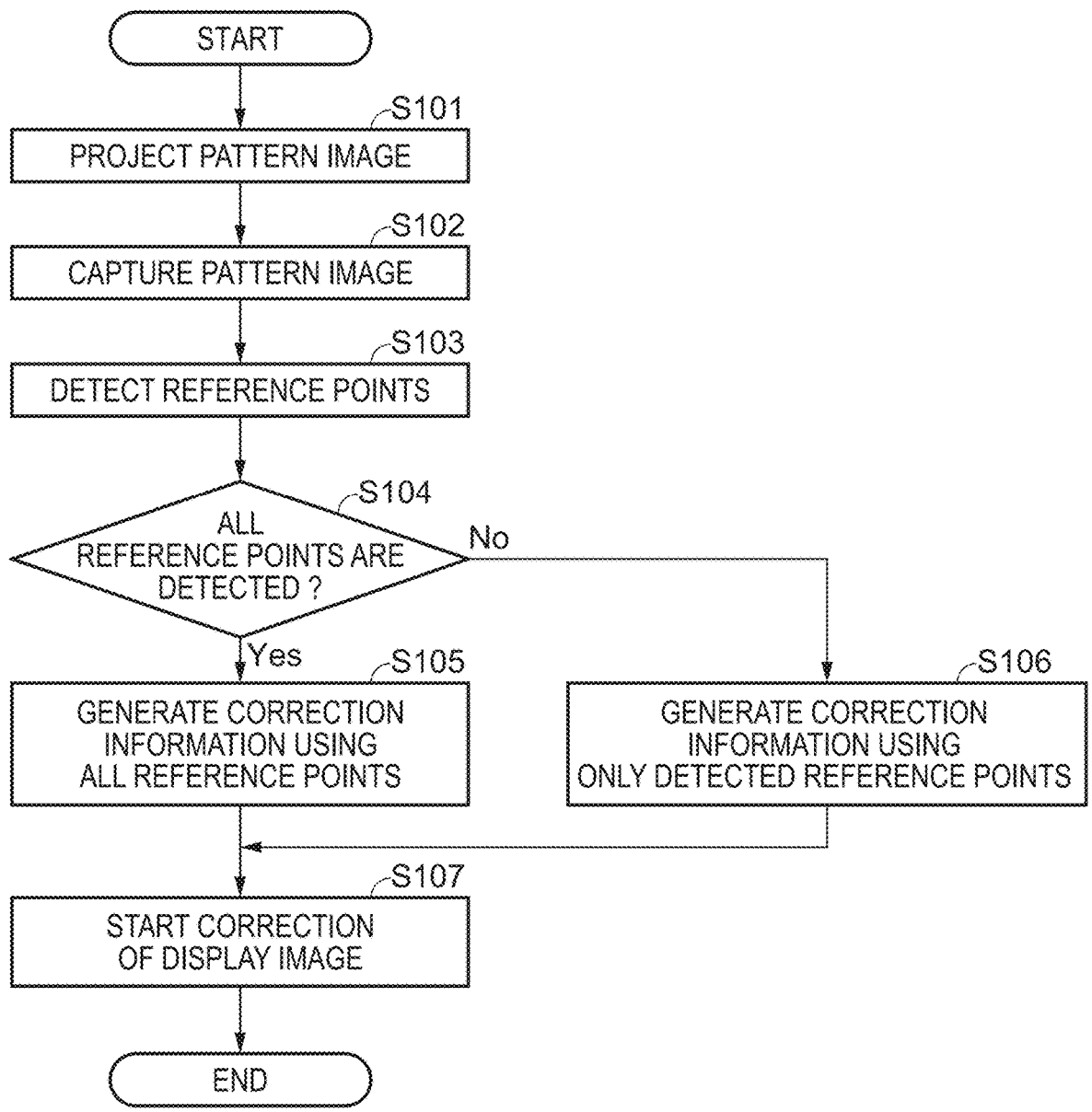
FIG. 3 is a flowchart for explaining the operation of the projector when distortion correction is performed.

FIG. 3 is a flowchart for explaining the operation (a control method) of the projector 100 in performing distortion correction.

When the user operates the input operation section 12 of the projector 100 to instruct a start of the distortion correction, the control section 10 of the projector 100 starts operation conforming to a control program for performing the distortion correction.

As shown in FIG. 3, in step S101, the control section 10 causes the image projecting section 15 to project the pattern image Ip. Specifically, the control section 10 reads out the pattern image data Dp from the storing section 11 and outputs the pattern image data Dp to the image-information input section 13. The control section 10 instructs the image-information correcting section 14 not to perform correction processing. As a result, the pattern image Ip is formed over the entire image forming region Ai and projected onto the projection surface Sp. When the image projecting section 15 is not right opposed to the projection surface Sp and when unevenness is present on the projection surface Sp, the pattern image Ip is distorted and displayed on the projection surface Sp.

In step S102, the control section 10 causes the image pickup section 16 to capture the pattern image Ip projected on the projection surface Sp.

Subsequently, in step S103, the control section 10 instructs the detecting section 17 to detect a plurality of reference points from a captured image obtained by the imaging section 16 capturing the pattern image Ip. As explained above, the detecting section 17 detects the vertexes of the unit patterns for detection U as reference points, generates identification information for identifying the reference points, and outputs coordinates of the reference points in the captured image and the identification information to the correction-information generating section 18.

In step S104, the control section 10 determines whether the detecting section 17 has successfully detected all the reference points. When all the reference points are detected, the control section 10 shifts the processing to step S105. When a part of the reference points are not detected, the control section 10 shifts the processing to step S106.

When all the reference points are detected and the processing shifts to step S105, the control section 10 instructs the correction-information generating section 18 to generate correction information using coordinates of all the detected reference points. Thereafter, in step S107, the control section 10 instructs the image-information input section 13 to output image information for a display image, outputs the generated correction information to the image-information correcting section 14, causes the image-information correcting section 14 to start correction of the display image, and ends the processing.

Figure 4A:
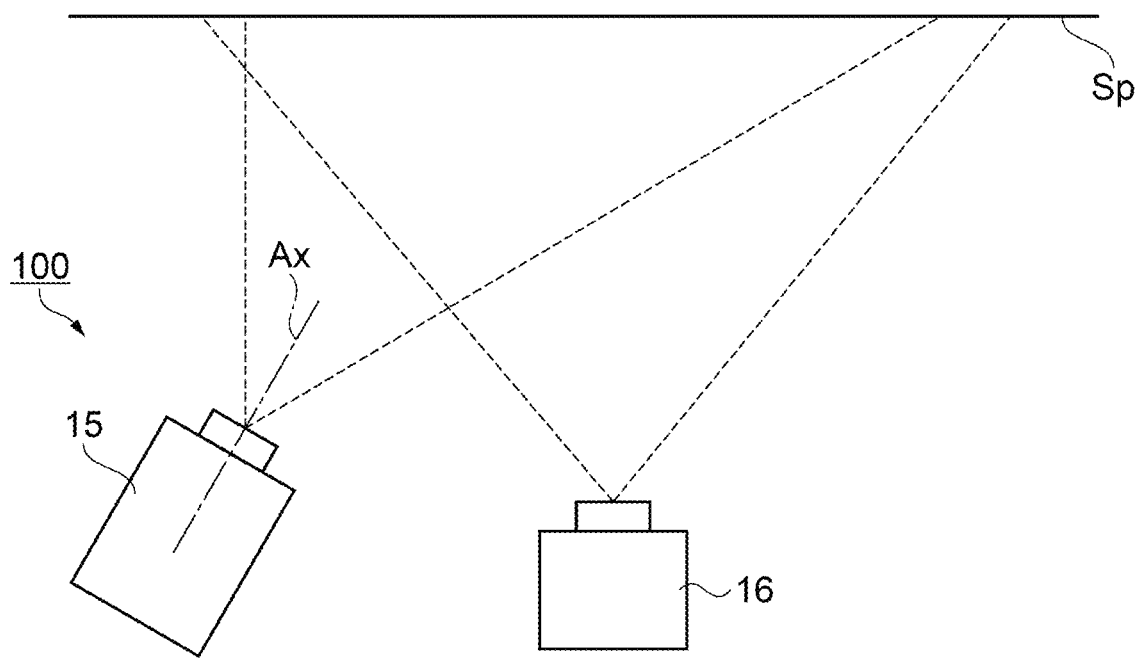
FIG. 4A is a plan view of a vertically disposed projection surface from above.
Figure 4B:
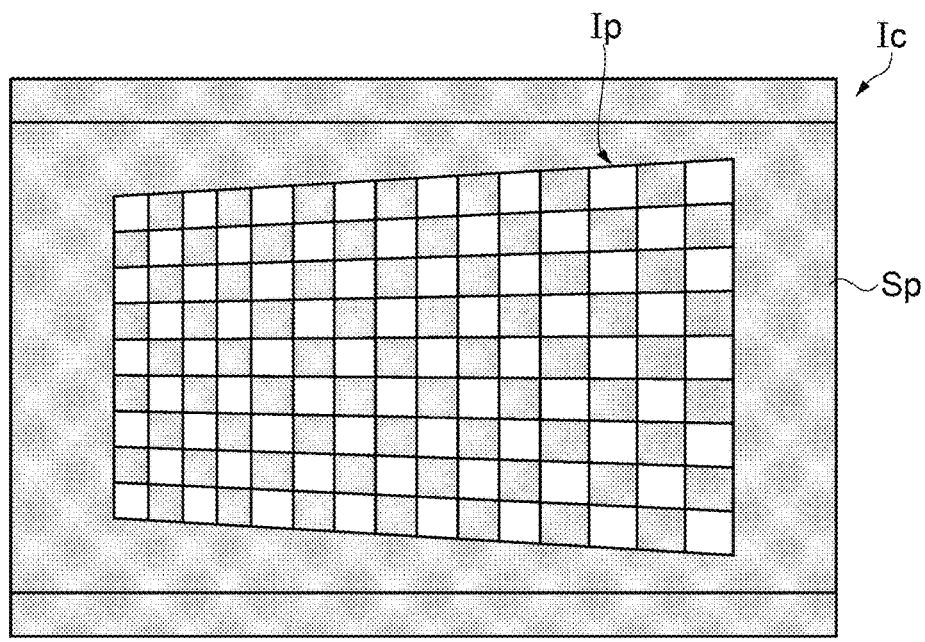
FIG. 4B is a diagram showing a captured image obtained by imaging, with an imaging section, a projection surface on which the pattern image is projected.
Figure 4C:
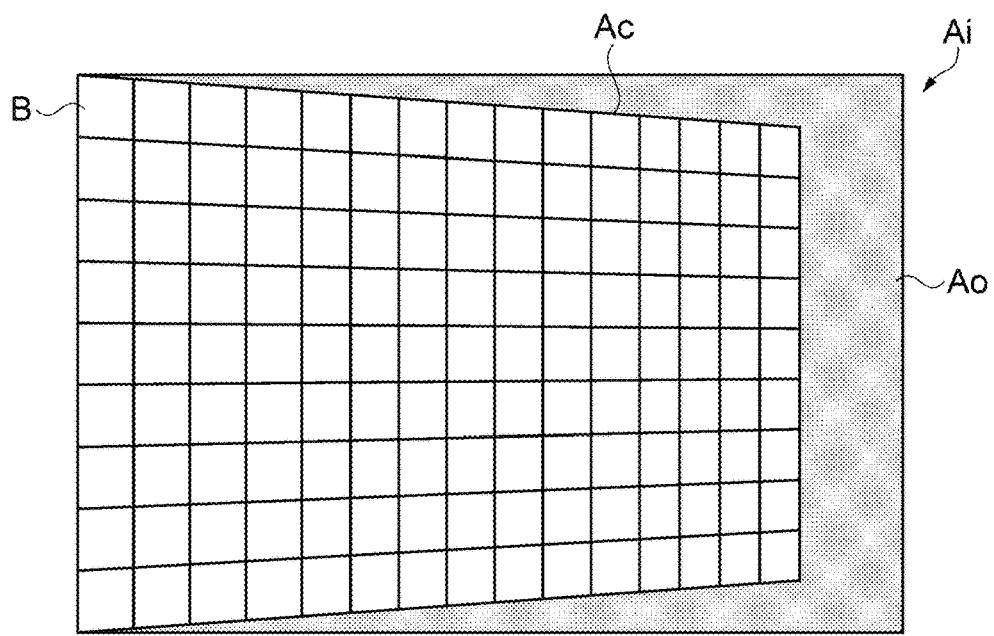
FIG. 4C is a diagram showing a correction region formed in an image forming region.
Figure 4D:
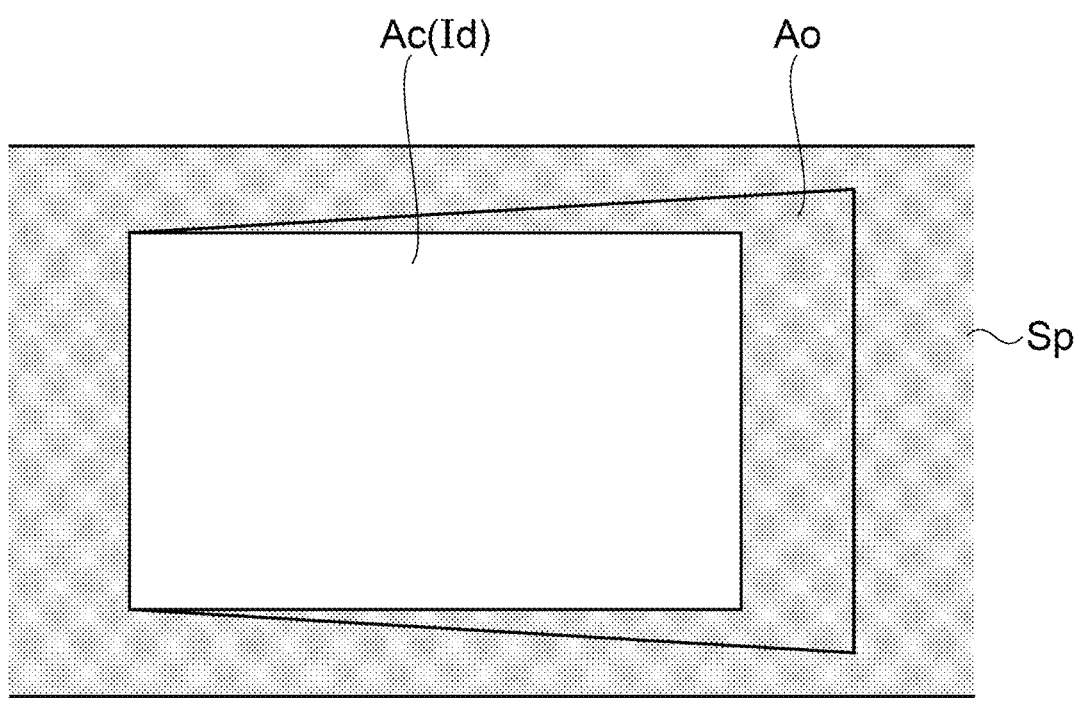
FIG. 4D is a diagram showing a state in which a display image is projected onto the projection surface in a distortion corrected state.

FIGS. 4A to 4D are diagrams for explaining distortion correction processing performed when all the reference points are detected. FIG. 4A is a plan view of a vertically disposed projection surface Sp viewed from above. FIG. 4B is a diagram showing a captured image Ic obtained by imaging the projection surface Sp, on which the pattern image Ip is projected, with the imaging section 16. FIG. 4C is a diagram showing a correction region Ac formed in the image forming region Ai. FIG. 4D is a diagram showing a state in which a display image Id is projected onto the projection surface Sp in a distortion corrected state.

For example, as shown in FIG. 4, when the projector 100 is set such that an optical axis Ax of the image projecting section 15 obliquely crosses the projection surface Sp, the pattern image Ip is distorted in a trapezoidal shape and projected (step S101). As shown in FIG. 4B, the captured image Ic including the pattern image Ip in a distorted state is captured by the imaging section 16 (step S102). Reference points are detected from the captured image Ic by the detecting section 17 (step S103).

When all the reference points are detected (Yes in step S104), the correction-information generating section 18 recognizes distortion for each of the unit patterns U on the basis of coordinates of the detected reference points and generates correction information for correcting the distortion. Specifically, coordinates (reference coordinates) of reference points in the rectangular pattern image Ip are known and stored in the storing section 11 in advance. The correction-information generating section 18 sets, in the image forming region Ai, on the basis of a correspondence relation between the coordinates (detected coordinates) of the reference points detected on the captured image Ic by the detecting section 17 and the reference coordinates, as shown in FIG. 4C, the correction region Ac formed by a plurality of blocks B of a shape with which only the distortion of the unit patterns U is offset. The correction-information generating section 18 generates, on the basis of the reference coordinates of the reference points and coordinates of vertexes of the blocks B in the correction region Ac, as the correction information, a conversion table for deforming (projection-converting) the display image in block B units and outputs the conversion table to the control section 10 (step S105).

The control section 10 outputs the input correction information to the image-information correcting section 14 and causes the image-information correcting section 14 to start correction of the image information on the basis of the correction information (step S107). Thereafter, the image-information correcting section 14 performs, on image information for a display image sequentially input from the image-information input section 13, correction processing for deforming the display image in block B units and performs processing for setting a region Ao on the outer side of the correction region Ac to black. As a result, as shown in FIG. 4D, the display image Id is projected in a state in which the distortion is corrected when viewed from the direction of the imaging section 16. Note that, in this embodiment, the distortion is corrected in block B units on the basis of a large number of reference points arrayed in a matrix shape. Therefore, even when small unevenness or the like is present on the projection surface Sp, it is also possible to correct distortion due to the unevenness or the like.

Referring back to FIG. 3, in step S104, when a part of the reference points are not detected and the processing shifts to step S106, the control section 10 instructs the correction-information generating section 18 to generate correction information using only a detected part of the reference points. Thereafter, in step S107, the control section 10 instructs the image-information input section 13 to output the image information for the display image, outputs the generated correction information to the image-information correcting section 14, causes the image-information correcting section 14 to start correction of the display image, and ends the processing.

Figure 5A:
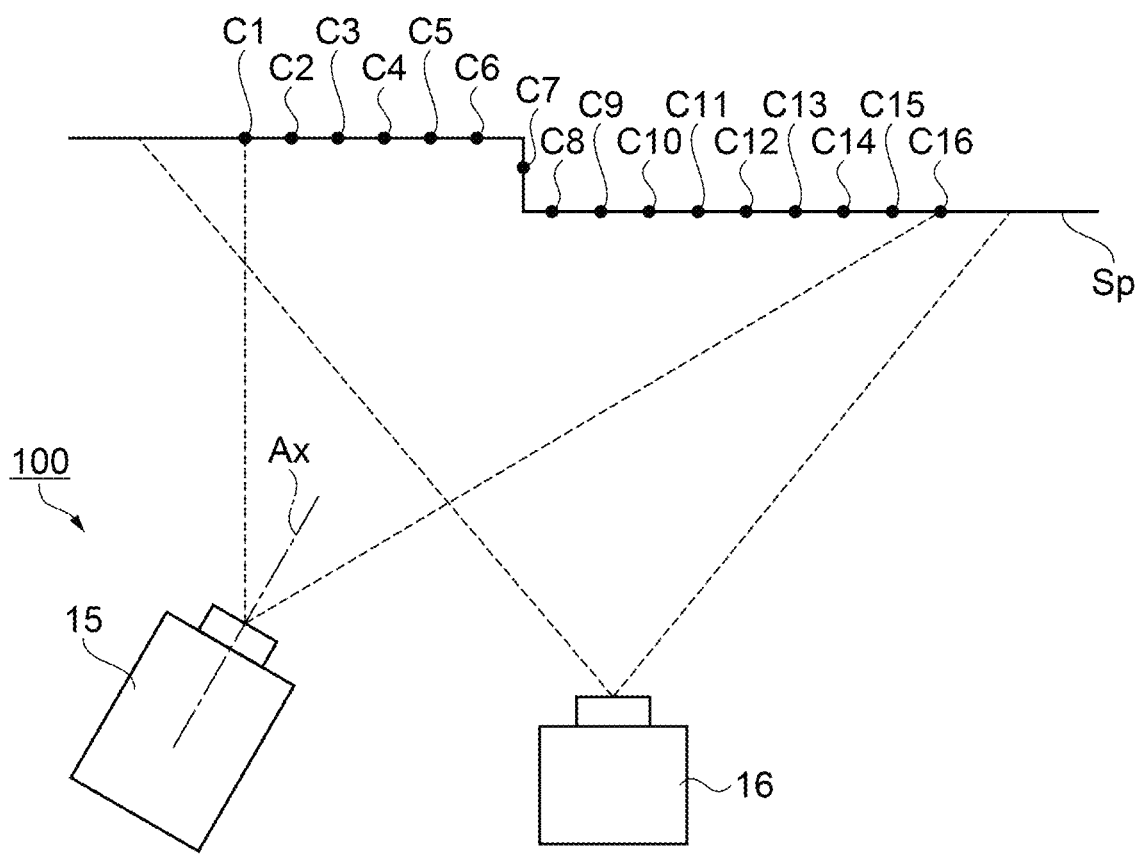
FIG. 5A is a plan view of the vertically disposed projection surface viewed from above.
Figure 5B:
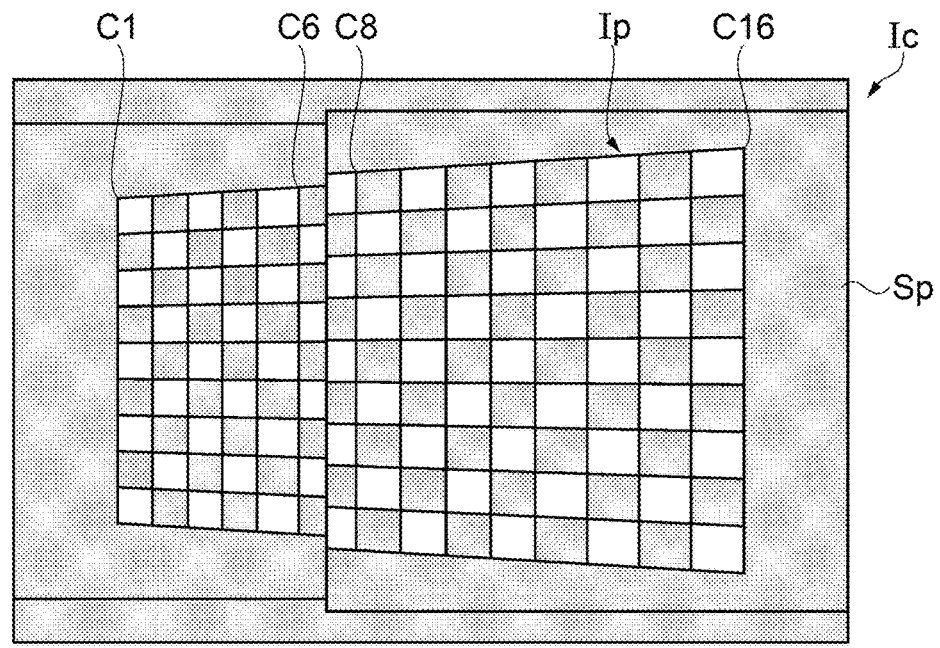
FIG. 5B is a diagram showing a captured image obtained by imaging, with the imaging section, the projection surface on which the pattern image is projected.
Figure 5C:
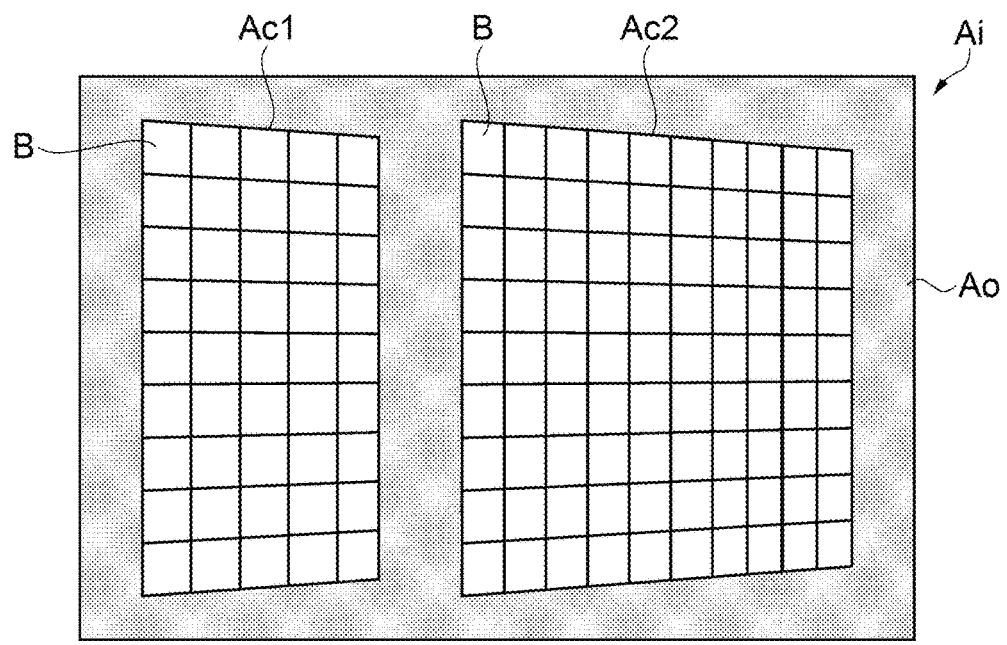
FIG. 5C is a diagram showing a correction region formed in an image forming region.
Figure 5D:
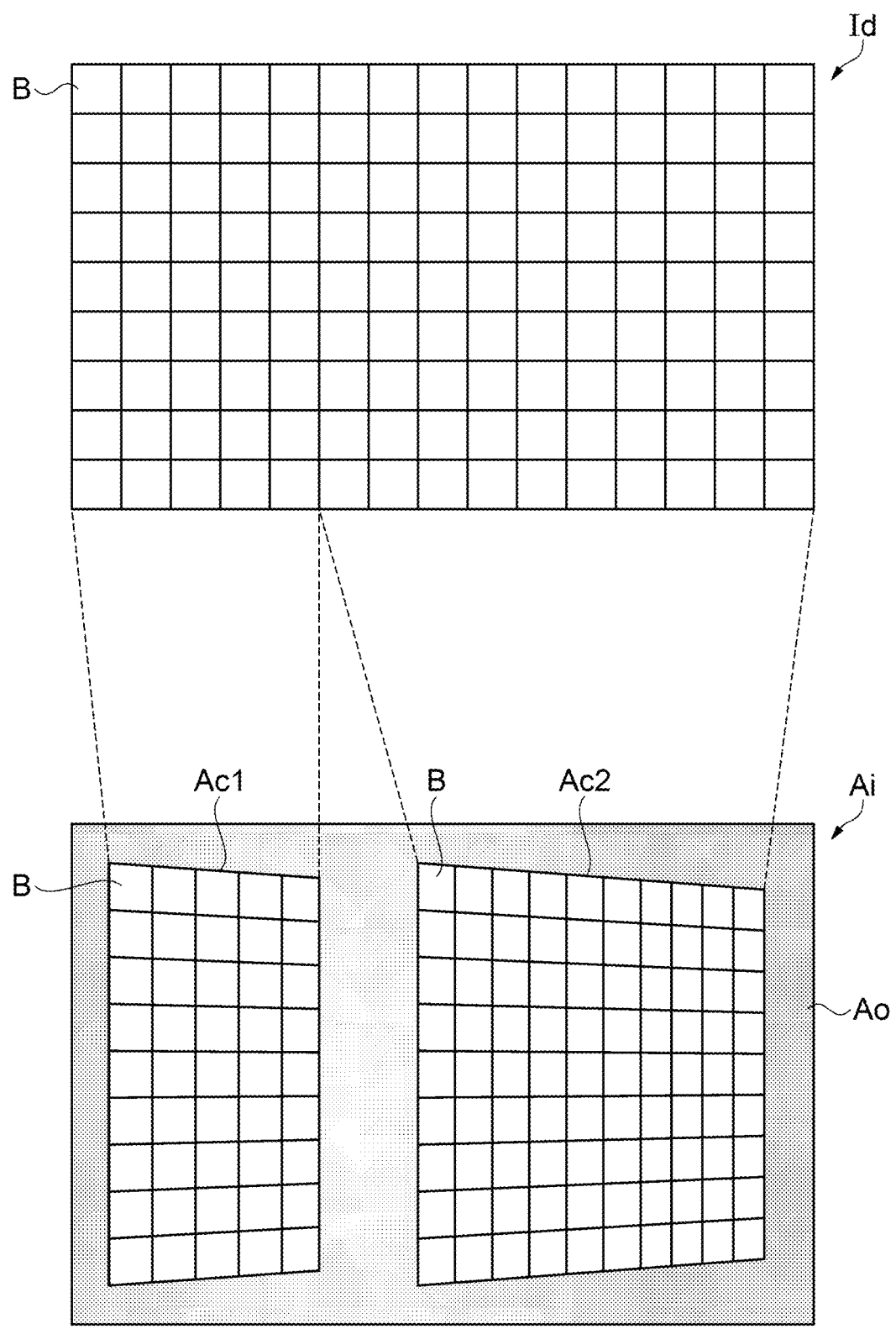
FIG. 5D is a diagram for explaining correction processing by an image-information correcting section.
Figure 5E:
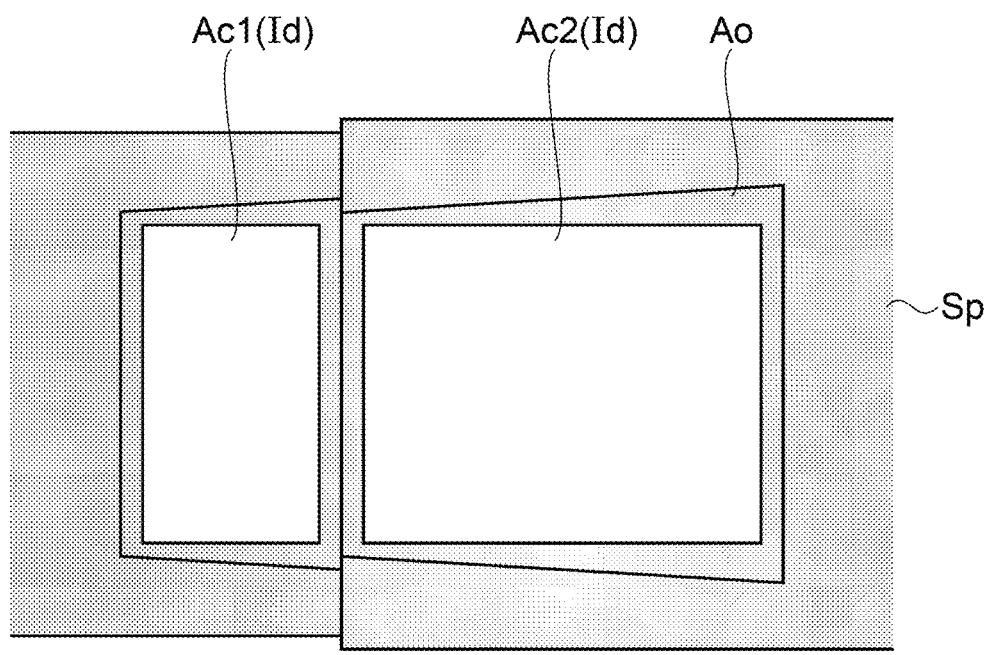
FIG. 5E is a diagram showing a state in which a display image is projected onto the projection surface in a distortion corrected state.

FIGS. 5A to 5E are diagrams for explaining distortion correction processing performed when a part of the reference points are not detected. FIG. 5A is a plan view of the vertically disposed projection surface Sp viewed from above. FIG. 5B is a diagram showing the captured image Ic obtained by imaging, with the imaging section 16, the projection surface Sp on which the pattern image Ip is projected. FIG. 5C is a diagram showing a first correction region Ac1 and a second correction region Ac2 formed in the image forming region Ai. FIG. 5D is a diagram for explaining correction processing by the image-information correcting section 14. FIG. 5E is a diagram showing a state in which the display image Id is projected onto the projection surface Sp in a distortion corrected state.

For example, as shown in FIG. 5A, when a relatively large step (unevenness) is present on the projection surface Sp and the projector 100 projects an image to overlap the step, a situation could occur in which a part of reference points are blocked by the step and cannot be imaged because of a parallax between the image projecting section 15 and the imaging section 16. FIG. 5A shows, when reference points disposed in the top row among the reference points included in the pattern image Ip are represented as reference points C1 to C16 (see FIG. 2) in order from the left, in which positions of the projection surface Sp the reference points C1 to C16 are projected. As shown in FIG. 5A, one reference point C7 among the reference points C1 to C16 is projected onto a blind area of the imaging section 16 and cannot be imaged by the imaging section 16 (see FIG. 5B). On the pattern image Ip, the same applies to other nine reference points present below the reference point C7. The detecting section 17 cannot detect ten reference points in total (No in step S104).

In such a case, if the pattern image Ip is a simple checkered pattern of two colors of white and black, it is difficult to distinguish, among a large number of reference points, which reference point is detected and which reference point is not detected. That is, because a correction relation between the reference coordinates of the reference points and the detected coordinates is unclear, the correction-information generating section 18 cannot generate correction information.

On the other hand, in this embodiment, when detecting the reference points, the detecting section 17 distinguishes a color of a detection target unit pattern U and generates, on the basis of the distinguished color, the positions of detection target vertexes in the unit pattern U, and the like, identification information for identifying the reference points. The detecting section 17 outputs the generated identification information to the correction-information generating section 18 together with coordinates.

The correction-information generating section 18 can identify the reference points on the basis of the identification information and specify to which vertexes in the basic pattern group V the reference points correspond. That is, the correction-information generating section 18 can estimate original positions (positions on the rectangular pattern image Ip) of the detected reference points. Therefore, a corresponding relation between the reference coordinates and the detected coordinates is clarified. As a result, the correction-information generating section 18 can generate correction information using only a detected part of the reference points.

Specifically, as shown in FIG. 5C, the correction-information generating section 18 sets, on the basis of reference points detected from the projection surface Sp on the left side of the step, in the image forming region Ai, the first correction region Ac1 formed by a plurality of blocks B of a shape with which the distortion of the unit patterns U is offset. Further, the correction-information generating section 18 sets, on the basis of reference points detected from the projection surface Sp on the right side of the step, the second correction region Ac2 also formed by a plurality of blocks B. The correction-information generating section 18 generates, on the basis of the reference coordinates of the reference points and coordinates of vertexes of the blocks B, as the correction information, a conversion table for deforming (projection-converting) the display image in block B units and outputs the conversion table to the control section 10 (step S106).

The control section 10 outputs the input correction information to the image-information correcting section 14 and causes the image-information correcting section 14 to start correction of the image information on the basis of the correction information (step S107). Thereafter, as shown in FIG. 5D, the image-information correcting section 14 performs, on image information for a display image sequentially input from the image-information input section 13, correction processing for dividing the display image Id into two and deforming the display image Id in block B units and performs processing for setting the region Ao on the outer side of the first correction region Ac1 and the second correction region Ac2 to black. As a result, as shown in FIG. 5E, the display image Id is projected on both the left and right sides of the step of the projection surface Sp in a state in which the distortion is corrected when viewed from the imaging section 16.

Figure 6:
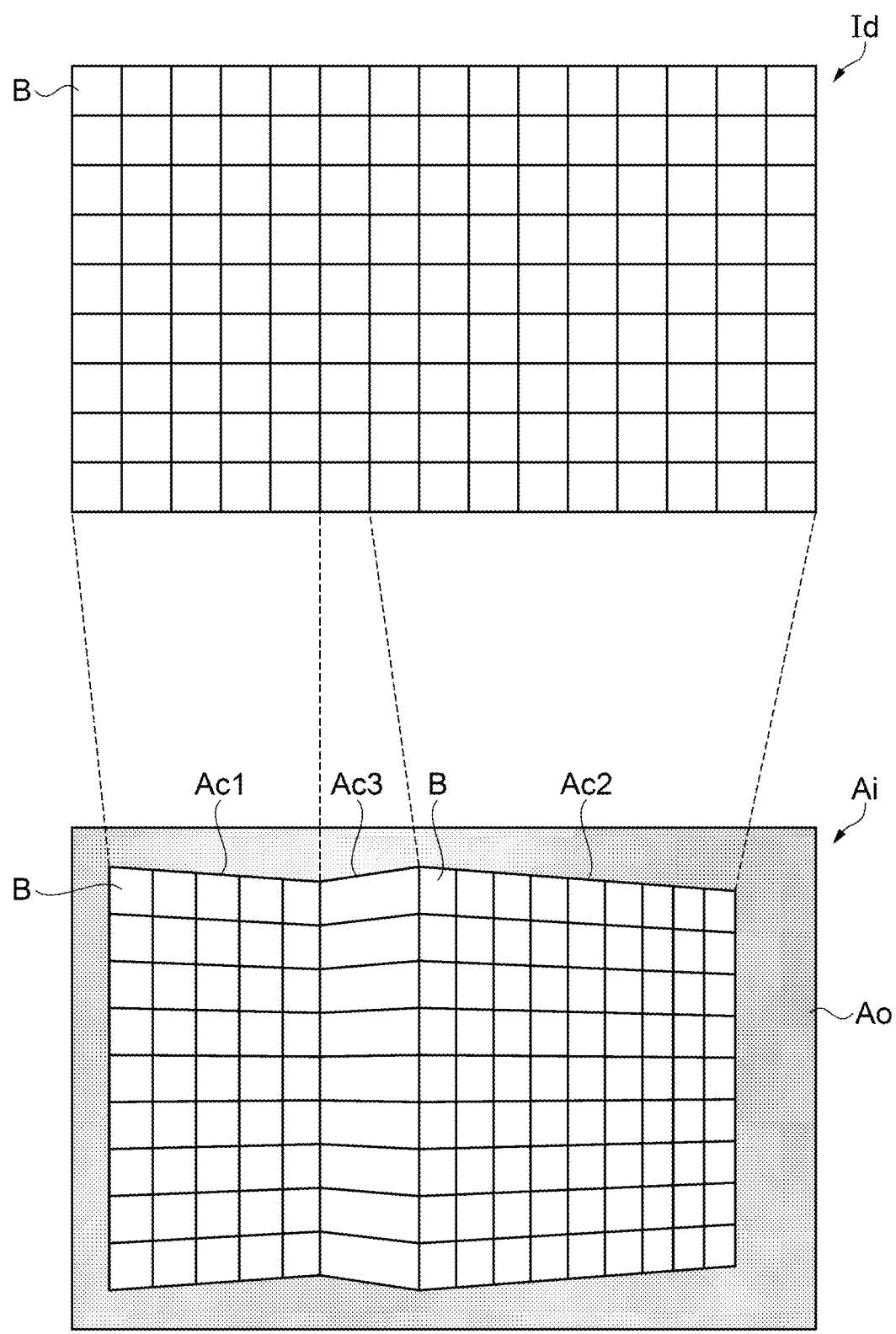
FIG. 6 is a diagram for explaining the correction processing by the image-information correcting section.

Note that, when the image-information correcting section 14 performs the correction processing explained above, the display image Id is divided into two parts by the black region Ao. However, the correction processing is not limited to this form. For example, as shown in FIG. 6, the correction-information generating section 18 may generate correction information for allocating a part of the display image Id to, together with the first correction region Ac1 and the second correction region Ac2, a third correction region Ac3 sandwiched by the first correction region Ac1 and the second correction region Ac2. With this form, although a part of the display image Id is blocked by the step when viewed from the direction of the imaging section 16, because the black region Ao is absent around the step, the display image Id is not divided. Alternatively, the image-information correcting section 14 may generate, on the basis of an image around a position where the display image Id is divided, an image that should be formed in the third correction region Ac3.

As explained above, with the projector 100 according to this embodiment, effects explained below can be obtained.

(1) With the projector 100 in this embodiment, because the pattern image Ip includes the unit patterns U of seven types (seven colors), it is possible to increase an interval of arrangement of the unit patterns U of the same color compared with when unit patterns U of two types like white rectangular patterns and black rectangular patterns are used. Therefore, even when a part of the reference points are not detected by the detecting section 17, it is possible to identify the detected reference point on the basis of the color of the unit patterns U. As a result, because a correspondence relation between the positions of the detected reference points and original positions (positions on the rectangular pattern image Ip) of the reference points is clarified, it is possible to appropriately correct an image.

(2) With the projector 100 in this embodiment, because the pattern image Ip includes the plurality of basic pattern groups V, it is possible to reduce a necessary number of colors of the unit patterns U. It is easy to distinguish the colors of the unit patterns U.

(3) With the projector 100 in this embodiment, because the detecting section 17 detects the vertexes of the unit patterns U as the reference points, it is possible to easily detect the reference points.

(4) With the projector 100 in this embodiment, because the image projecting section 15 and the imaging section 16 are integrally configured, it is unnecessary to adjust disposition of the image projecting section 15 and the imaging section 16 every time.

(5) With the projector 100 in this embodiment, the colors (red, green, blue, cyan, magenta, yellow, and black) of the unit patterns U are set to colors obtained by maximizing or minimizing the light transmittance of the liquid crystal light valves 22R, 22G, and 22, that is, colors not having intermediate gradations. Therefore, it is possible to easily distinguish the colors. Besides the seven colors, the unit patterns U of white obtained by maximizing the light transmittance of all the liquid crystal light valves 22R, 22G, and 22B may be used.

Note that the number of colors of the unit patterns U only has to be three or more. As the number of colors is reduced, it is easier to distinguish the colors with the detecting section 17. However, when number of colors of the unit patterns U is reduced, the basic pattern group V decreases in size and the unit patterns U of the same color are arranged at a small interval. Therefore, when the unit patterns U are identified, the unit patterns U are likely to be confused with neighboring unit patterns U of the same color. Therefore, the number of colors of the unit patterns U is desirably increased as much as possible within a range in which distinction by the detecting section 17 is possible. Colors having intermediate gradations may be used if the detecting section 17 can distinguish the colors. All the unit patterns for detection U included in the pattern image Ip may be set to colors different from one another.

Second Embodiment

A projector in a second embodiment is explained below with reference to the drawings.

When performing processing for correcting distortion, the projector 100 in this embodiment projects the pattern image Ip different from the pattern image Ip projected by the projector 100 in the first embodiment.

Figure 7:
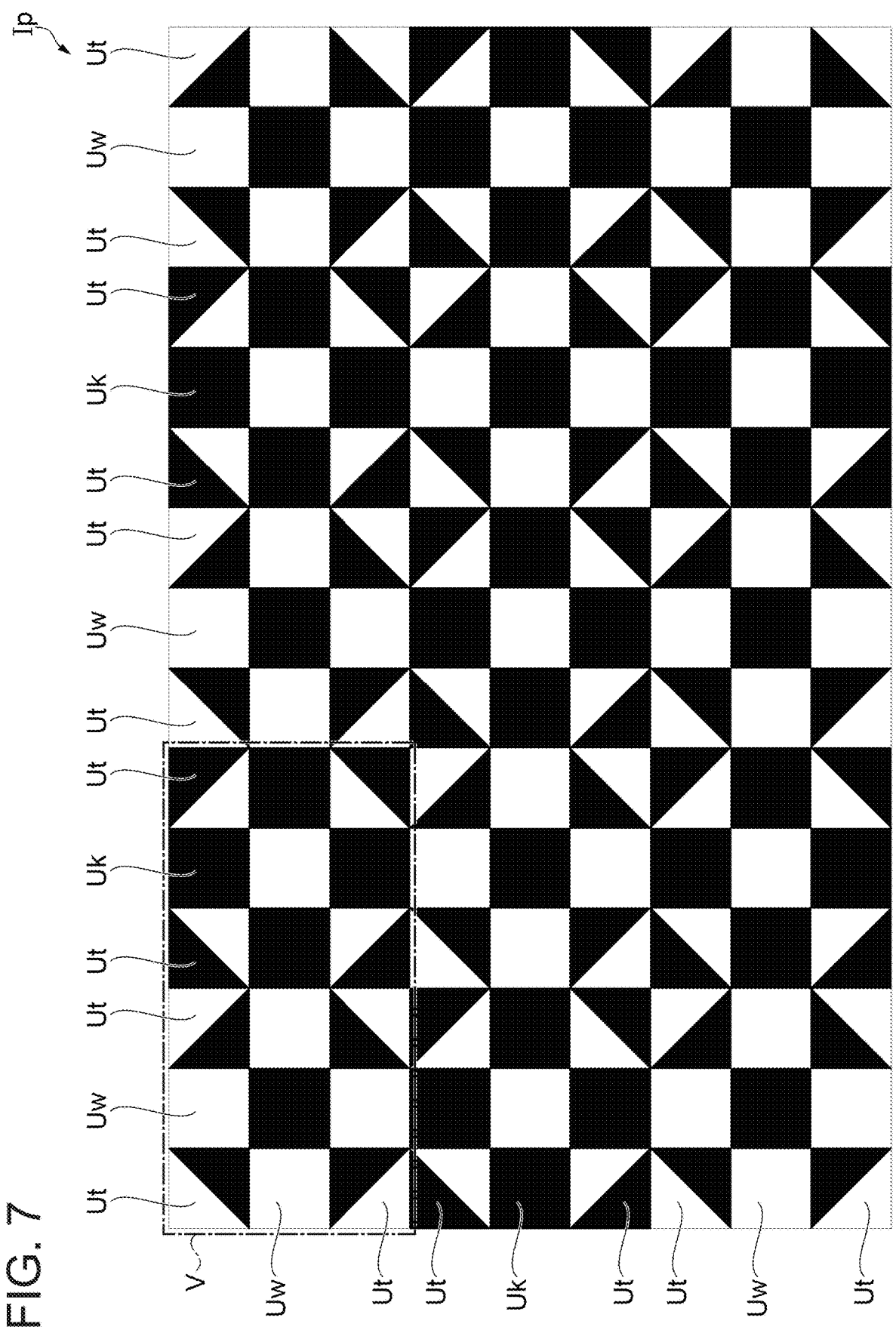
FIG. 7 is a diagram showing a pattern image in a second embodiment.

FIG. 7 is a diagram showing the pattern image Ip in this embodiment.

As shown in FIG. 7, the pattern image Ip in this embodiment includes a plurality of rectangular (in this embodiment, square) unit patterns U. The plurality of unit patterns U include unit patterns Uw entirely colored in white, unit patterns Uk entirely colored in black, and unit patterns Ut of two colors obtained by combining white triangles and black triangles. The unit pattern Ut of two colors is the unit pattern U in which one of two triangles (in this embodiment, isosceles right triangles) generated by dividing the rectangular unit pattern U with a diagonal line is colored in white and the other is colored in black. The unit patterns U can be further classified into four according to a positional relation between the white triangle and the black triangle (e.g., according to in which position of the upper left, the upper right, the lower left, and the lower right the white triangle is located). That is, the pattern image Ip in this embodiment is configured by unit patterns U of six types having different patterns.

In this embodiment, the detecting section 17 of the projector 100 detects, as reference points, vertexes of the unit pattern Uw entirely colored in while and vertexes of white triangles of the unit patterns Ut of two colors. That is, unit patterns U of five types including the unit pattern Uw entirely colored in white (one type) and unit patterns Ut of two colors (four types) are used as the unit patterns for detection U. The pattern image Ip is an image on which a plurality of rectangular unit patterns U are arranged in a matrix shape longitudinally and laterally. The unit patterns U are disposed such that vertexes of all the unit patterns U are detected as reference points of any one of the unit patterns for detection U. That is, a plurality of reference points are also arranged in a matrix shape.

In FIG. 7, a rectangular range indicated by an alternate long and short dash line indicates the basic pattern group V in which a plurality of unit patterns U are arranged in a predetermined array. The basic pattern group V does not include the same combination of a plurality of unit patterns U surrounding detection target reference points (vertexes). The pattern image Ip is an image including a plurality of basic pattern groups V. In other words, the pattern image Ip is a part of an image on which a plurality of the same basic pattern groups V are arrayed longitudinally and laterally. Note that, in the pattern image Ip shown in FIG. 7, the basic pattern groups V are repeatedly arrayed in the lateral direction. The basic pattern groups V adjacent to one another in the longitudinal direction are arranged to be shifted by three columns (three unit patterns U).

When detecting reference points, the detecting section 17 generates identification information on the basis of a type (a pattern) of a detection target unit pattern U, a position of a detection target vertex in the unit pattern U, types (patterns) of the other unit patterns U surrounding the vertex, and the like and outputs the identification information to the correction-information generating section 18 together with coordinates. Therefore, even when a part of the reference points are not detected because of unevenness (a step, etc.) of the projection surface Sp, the correction-information generating section 18 can estimate original positions (positions on the rectangular pattern image Ip) of the reference points on the basis of the identification information. A correspondence relation between reference coordinates and detected coordinates is clarified. As a result, the correction-information generating section 18 can generate correction information using only a detected part of the reference points.

As explained above, with the projector 100 in this embodiment, the pattern image Ip includes the five unit patterns for detection U having the different patterns. Therefore, it is possible to increase an interval of arrangement of the unit patterns U of the same types compared with when the unit patterns U of two types like a white rectangular pattern and a black rectangular pattern are used. Therefore, even when a part of the reference points are not detected by the detecting section 17, it is possible to identify detected reference points on the basis of the patterns and the like of the unit patterns U. As a result, a correspondence relation between the positions of the detected reference points and original positions (positions on the rectangular pattern image Ip) of the reference points is clarified. Therefore, it is possible to appropriately correct an image.

Note that the number of types of the unit patterns U only has to be three or more. However, as in the first embodiment, it is desirable to increase the number as much as possible within a range in which distinction by the detecting section 17 is possible.

Third Embodiment

A projector according to a third embodiment is explained below with reference to the drawings.

When performing processing for correcting distortion, the projector 100 in this embodiment projects the pattern image Ip different from the pattern image Ip projected by the projector 100 in the embodiments explained above.

Figure 8:
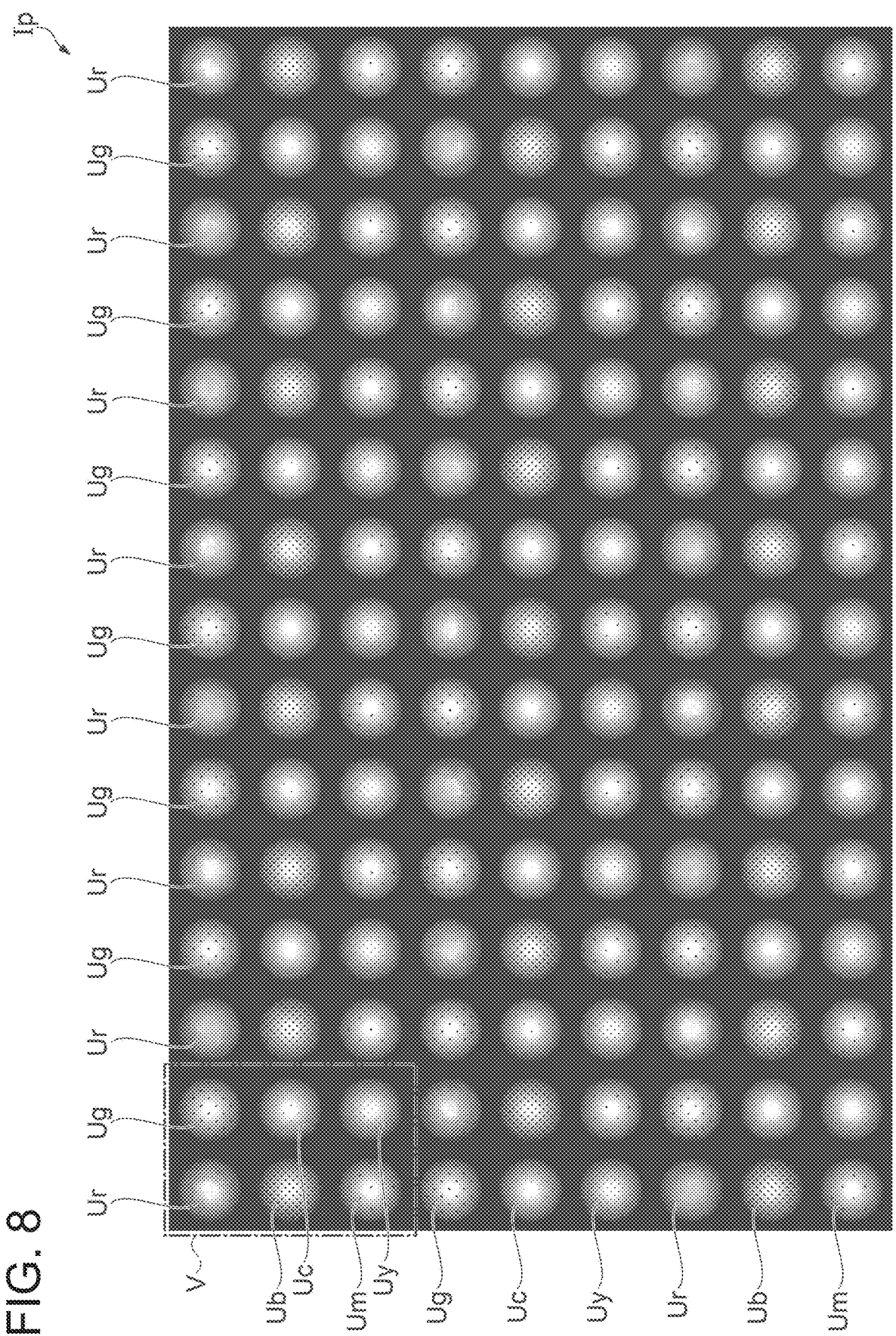
FIG. 8 is a diagram showing a pattern image in a third embodiment.

FIG. 8 is a diagram showing the pattern image Ip in this embodiment.

As shown in FIG. 8, the pattern image Ip in this embodiment is an image on which a plurality of unit patterns U (Ur, Ug, Ub, Uc, Um, and Uy) having luminance distributions are arranged in a matrix shape longitudinally and laterally. The plurality of unit patterns U include the unit patterns U of six colors, that is, red unit patterns Ur, green unit patterns Ug, blue unit patterns Ub, cyan unit patterns Uc, magenta unit patterns Um, and yellow unit patterns Uy. The unit patterns have luminance distributions in which luminance is the largest in the centers of the luminance distributions. In this embodiment, all the unit patterns U of the six colors are the unit patterns for detection U.

In FIG. 8, a rectangular range indicated by an alternate long and short dash line indicates the basic pattern group V in which six unit patterns U are arranged in a 2×3 matrix shape. The unit patterns U, one each of which is for each of the colors, are arranged in a predetermined array. The pattern image Ip is an image including a plurality of basic pattern groups V. In other words, the pattern image Ip is a part of an image on which a plurality of the same basic pattern groups V are arrayed longitudinally and laterally. Note that, in the pattern image Ip shown in FIG. 8, the basic pattern groups V are repeatedly arrayed in the lateral direction and the basic pattern groups V adjacent to one another in the longitudinal direction are arranged to be shifted by one column (by one unit pattern U).

In this embodiment, the detecting section 17 of the projector 100 detects, from the pattern image Ip captured by the imaging section 16, as reference points, positions where luminance is the largest (maximum luminance positions) in the unit patterns U. In the pattern image Ip, the reference points are arranged in a matrix shape.

When detecting the reference points, the detecting section 17 generates identification information on the basis of a color of a detection target unit pattern U and outputs the identification information to the correction-information generating section 18 together with coordinates. Therefore, even when a part of the reference points are not detected because of unevenness (a step, etc.) of the projection surface Sp, it is possible to estimate original positions (positions on the rectangular pattern image Ip) of the reference points. A correspondence relation between reference coordinates and detected coordinates is clarified. As a result, the correction-information generating section 18 can generate correction information using only a detected part of the reference points.

Note that the detecting section 17 may be configured to determine the maximum luminance positions on the basis of a rate of change (a gradient) of the luminance of regions around the maximum luminance positions. In this case, even when the maximum luminance positions are blocked by unevenness or the like of the projection surface Sp, it is possible to estimate the maximum luminance positions.

As explained above, with the projector 100 in this embodiment, because the reference points are detected on the basis of the luminance of the unit patterns U, it is possible to accurately detect the reference points. In particular, the projector 100 is effective when the vertexes of the rectangular unit patterns U cannot be accurately detected as in the first embodiment because the spectral reflectance of the projection surface Sp is different depending on places and is affected by external light.

Fourth Embodiment

A projector in a fourth embodiment is explained below with reference to the drawings.

When performing processing for correcting distortion, the projector 100 in this embodiment projects the pattern image Ip different from the pattern image Ip projected by the projector 100 in the embodiments explained above.

Figure 9:
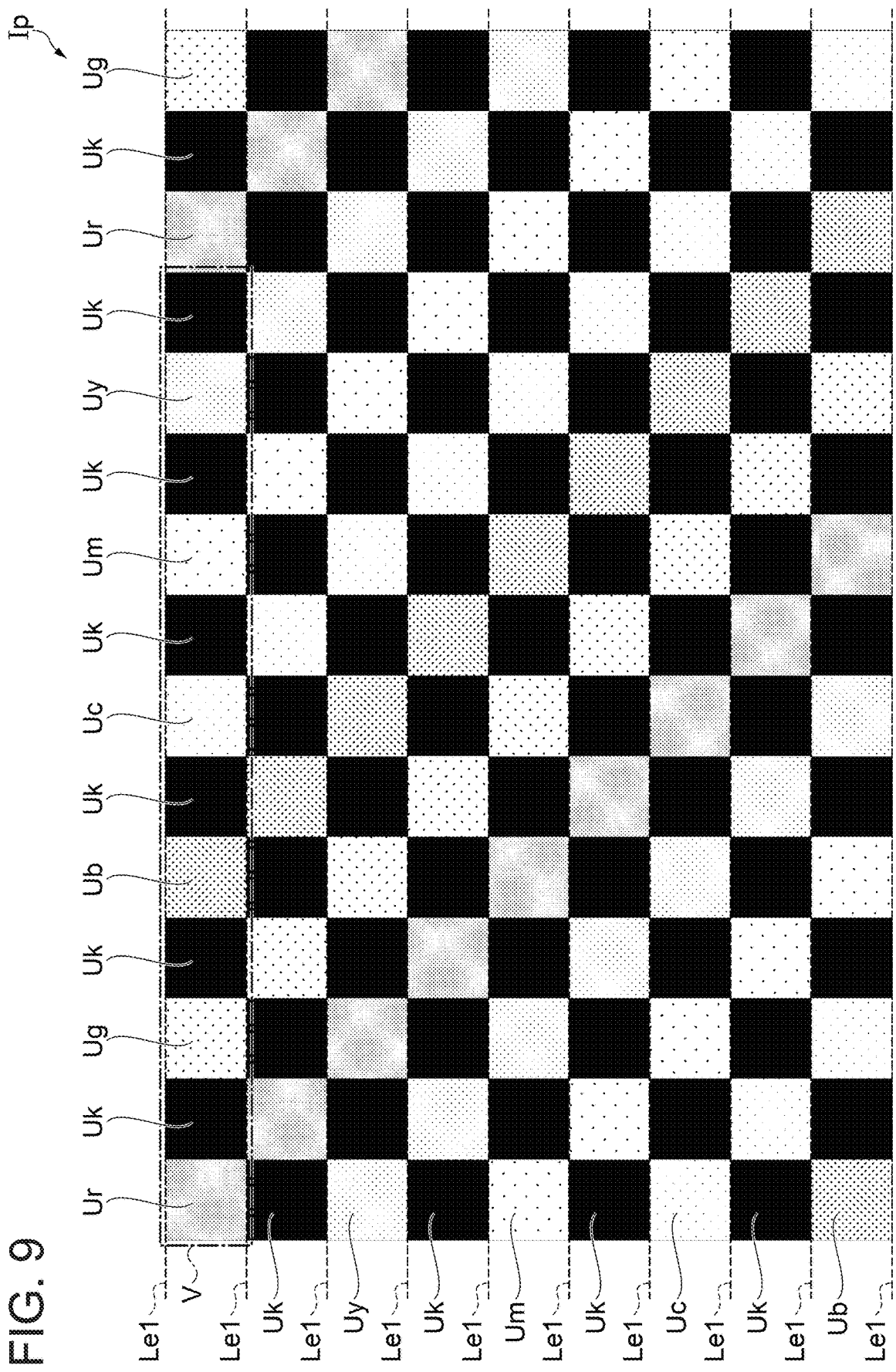
FIG. 9 is a diagram showing a pattern image in a fourth embodiment.

FIG. 9 is a diagram showing the pattern image Ip in this embodiment.

As shown in FIG. 9, the pattern image Ip is an image on which a plurality of unit patterns U (Ur, Ug, Ub, Uc, Um, and Uy) are arranged in a matrix shape. The plurality of unit patterns U include the unit patterns U of seven colors, that is, red unit patterns Ur, green unit patterns Ug, blue unit patterns Ub, cyan unit patterns Uc, magenta unit patterns Um, yellow unit patterns Uy, and black unit patterns Uk. The unit patterns of six colors other than the black unit patterns Uk are the unit patterns for detection U.

The unit patterns for detection U are arranged in a checkered pattern not to be adjacent to one another. The black unit patterns Uk are arranged in positions other than positions where the unit patterns for detection U are arranged. As in the first embodiment, the detecting section 17 of the projector 100 detects vertexes of the unit patterns for detection U as reference points from the pattern image Ip captured by the imaging section 16. In the pattern image Ip, the reference points are arranged in a matrix shape.

In FIG. 9, a rectangular range indicated by an alternate long and short dash line indicates the basic pattern group V. The basic pattern group V in this embodiment is a pattern group in which twelve unit patterns U are arranged in a row in the lateral direction. In the basic pattern group V, the unit patterns for detection U, one each of which are for each of the colors, are arranged in predetermined order alternately with the black unit patterns Uk. The pattern image Ip is an image including a plurality of basic pattern groups V. In other words, the pattern image Ip is a part of an image on which a plurality of the same basic pattern groups V are arrayed longitudinally and laterally. Note that, in the pattern image Ip shown in FIG. 9, the basic pattern groups V are repeatedly arrayed in the lateral direction and the basic pattern groups V adjacent to one another in the longitudinal direction are arranged to be shifted by one column (by one unit pattern U).

In this embodiment, the unit patterns U are arranged along a plurality of epipolar lines Le1 decided according to a disposition relation between the image projecting section 15 and the imaging section 16. Specifically, the unit patterns U are arranged in a matrix shape in a direction along the epipolar lines Le1 and a direction crossing the epipolar lines Le1. Vertexes of the unit patterns for detection U are located on the epipolar lines Le1.

The epipolar lines Le1 are explained.

Figure 10:
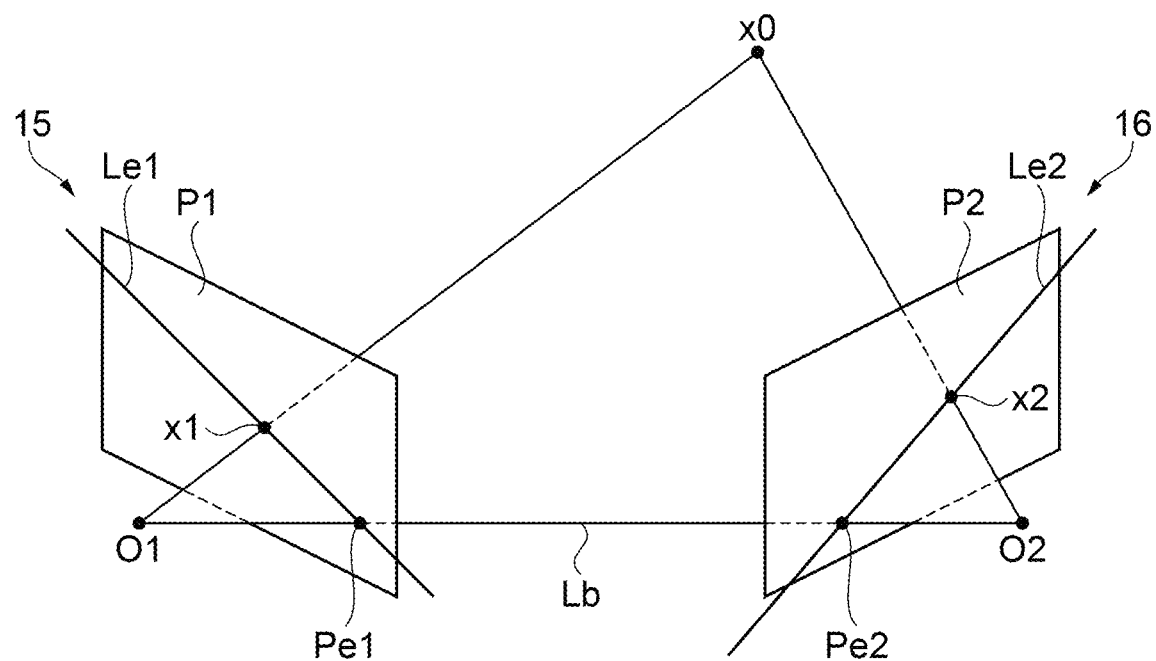
FIG. 10 is an explanatory diagram for explaining an epipolar geometry concerning an image projecting section and an imaging section.

FIG. 10 is an explanatory diagram for explaining an epipolar geometry concerning the image projecting section 15 and the imaging section 16.

As shown in FIG. 10, a straight line connecting an optical center O1 of the image projecting section 15 and an optical center O2 of the imaging section 16 is set as a baseline Lb. In an imaginary image plane P1 (a plane equivalent to the image forming region Ai) of the image projecting section 15, all straight lines passing an intersection (an epipole Pe1) with the baseline Lb are the epipolar lines Le1. When one epipolar line Le1 is decided in the imaginary image plane P1, an epipolar line Le2 corresponding to the epipolar line Le1 is specified on an imaginary image plane P2 (a plane equivalent to the captured image Ic) of the imaging section 16. The epipolar line Le2 is a straight line passing an intersection (an epipole Pe2) with the baseline Lb in the imaginary image plane P2. Light projected from any position x1 on the epipolar line Le1 of the imaginary image plane P1 onto a position x0 on the projection surface Sp is projected (imaged) in any position (e.g., a position x2) on the corresponding epipolar line Le2 on the imaginary image plane P2 irrespective of the distance to the projection surface Sp.

Note that, in FIG. 9, for convenience of explanation, the epipolar lines Le1 are represented by a plurality of parallel lines. However, as explained above, because all the epipolar lines Le1 are straight lines passing a common epipole Pe1, in general, the epipolar lines Le1 radially extend. In this case, the shape of the unit patterns U is not a rectangle. However, when an optical axis of the image projecting section 15 and an optical axis of the imaging section 16 are parallel, the epipole Pe1 is located at infinity. Therefore, the plurality of epipolar lines Le1 are substantially parallel.

In this way, in this embodiment, the unit patterns for detection U are arranged such that the vertexes are located on the epipolar lines Le1 decided in advance. Epipolar lines Le2 on the captured image Ic corresponding to the epipolar lines Le1 can be determined in advance according to the disposition relation between the image projecting section 15 and the imaging section 16. Therefore, the detecting section 17 can detect the reference points by searching for the reference points on the epipolar lines Le2 determined in advance. When detecting the reference points, the detecting section 17 generates identification information on the basis of the color and the like of the detection target unit pattern U and outputs the identification information to the correction-information generating section 18 together with coordinates. Therefore, even when a part of the reference points are not detected because of unevenness (a step, etc.) of the projection surface Sp, the correction-information generating section 18 can estimate original positions (positions on the rectangular pattern image Ip) of the reference points on the basis of the identification information. A correspondence relation between reference coordinates and detected coordinates is clarified. As a result, the correction-information generating section 18 can generate correction information using only a detected part of the reference points.

Even when the other unit patterns U of the same color are located near the unit patterns for detection U, if the other unit patterns U are present in positions away from the search target epipolar line Le2 in the perpendicular direction, it is unlikely that the unit patterns for detection U and the other unit patterns U are confused. Therefore, even when the basic pattern group V is formed in a configuration in which the plurality of unit patterns U are arranged in a row along the epipolar line Le1 as in this embodiment, it is possible to easily identify the reference points.

As explained above, with the projector 100 in this embodiment, because the detecting section 17 can detect the reference points along the epipolar line Le2, it is easy to detect the reference points.

As explained above, in the direction crossing the epipolar line Le2, even when the unit patterns U of the same type are present in the vicinity, it is unlikely that the unit patterns U are confused. Therefore, in the basic pattern group V, it is possible to array the unit patterns U of the same color in a row along the epipolar line Le1. As a result, it is possible to arrange the unit patterns U of the same color apart from one another in the direction along the epipolar line Le1. Therefore, the unit patterns U are prevented from being confused with the other unit patterns U.

Note that the epipolar line Le1 on the pattern image Ip (the image forming region Ai) is equivalent to a first epipolar line and the epipolar line Le2 on the captured image Ic is equivalent to a second epipolar line.

Fifth Embodiment

A projector in a fifth embodiment is explained below with reference to the drawings.

When performing processing for correcting distortion, the projector 100 in this embodiment projects the pattern image Ip different from the pattern image Ip projected by the projector 100 in the embodiments explained above.

FIG. 11 is a diagram showing the pattern image Ip in this embodiment.

As shown in FIG. 11, the pattern image Ip is an image on which a plurality of belt-like unit patterns U (Ur, Ug, Ub, Uc, Um, Uy, and Uk) arranged to extend in the longitudinal direction (a direction crossing the epipolar lines Le1) are arrayed in a row in the lateral direction (a direction along the epipolar lines Le1). The plurality of unit patterns U include the unit patterns U of seven colors, that is, red unit patterns Ur, green unit patterns Ug, blue unit patterns Ub, cyan unit patterns Uc, magenta unit patterns Um, yellow unit patterns Uy, and black unit patterns Uk. The unit patterns U of six colors other than the black unit patterns Uk are the unit patterns for detection U.

In FIG. 11, a rectangular range indicated by an alternate long and short dash line indicates the basic pattern group V. The basic pattern group V in this embodiment is a pattern group in which twelve unit patterns U are arranged in a row in the lateral direction. In the basic pattern group V, the unit patterns for detection U, one each of which are for each of the colors, are arranged in predetermined order alternately with the black unit patterns Uk. The pattern image Ip is a part of an image on which a plurality of the same basic pattern groups V are arrayed in the lateral direction.

In this embodiment, end portions of the unit patterns for detection U, that is, points on boundary lines between the unit patterns for detection U and the black unit patterns Uk are used as reference points. Specifically, intersections of a plurality of epipolar lines Le1 decided in advance and the end portions (the boundary lines) of the unit patterns for detection U are used as the reference points. The reference points are arranged in a matrix shape in the pattern image Ip (the image forming region Ai). In the storing section 11, coordinates of the reference points in the pattern image Ip are stored as reference coordinates. The epipolar lines Le2 on the captured image Ic corresponding to the epipolar lines Le1 can be determined in advance according to a disposition relation between the image projecting section 15 and the imaging section 16. Therefore, the detecting section 17 can detect, in the captured image Ic, intersections of the epipolar lines Le2 determined in advance and the end portions of the unit patterns for detection U as the reference points (detected coordinates).

When detecting the reference points, the detecting section 17 generates identification information on the basis of the color and the like of the detection target unit pattern U and outputs the identification information to the correction-information generating section 18 together with coordinates. Therefore, even when a part of the reference points are not detected because of unevenness (a step, etc.) of the projection surface Sp, the correction-information generating section 18 can estimate original positions (positions on the rectangular pattern image Ip) of the reference points on the basis of the identification information. A correspondence relation between the reference coordinates and the detected coordinates is clarified. As a result, the correction-information generating section 18 can generate correction information using only a detected part of the reference points.

Note that, in this embodiment, the belt-like unit patterns U are arranged to be orthogonal to the epipolar lines Le1. Therefore, when a plurality of epipolar lines Le1 are not parallel and radially extend, the unit patterns U are formed as arcuate patterns to be orthogonal to the epipolar lines Le1. However, a relation between the belt-like unit patterns U and the epipolar lines Le1 only has to be a crossing relation and is not limited to the orthogonal relation.

As explained above, with the projector 100 in this embodiment, as in the fourth embodiment, the detecting section 17 can detect the reference points along the epipolar lines Le2. Therefore, it is easy to detect the reference points.

With the projector 100 in this embodiment, the belt-like unit patterns U are arrayed in a row along the epipolar line Le1. Therefore, it is possible to arrange the unit patterns U of the same color apart from one another in a direction along the epipolar line Le1. Therefore, the unit patterns U are prevented from being confused with the other unit patterns U.

With the projector 100 in this embodiment, the detecting section 17 detects the end portions of the unit patterns U as the reference points. Therefore, it is possible to easily detect the reference points.

Sixth Embodiment

A projector in a sixth embodiment is explained below with reference to the drawings.

When performing processing for correcting distortion, the projector 100 in this embodiment projects the pattern image Ip different from the pattern image Ip projected by the projector 100 in the embodiments explained above.

FIG. 12 is a diagram showing the pattern image Ip in this embodiment.

As shown in FIG. 12, the pattern image Ip in this embodiment is an image on which a plurality of belt-like unit patterns U (Ur, Ug, Ub, Uc, Um, and Uy) arranged to extend in the longitudinal direction (a direction crossing the epipolar lines Le1) are arrayed in a row in the lateral direction (a direction along the epipolar lines Le1). The plurality of unit patterns U include the unit patterns U of six colors, that is, red unit patterns Ur, green unit patterns Ug, blue unit patterns Ub, cyan unit patterns Uc, magenta unit patterns Um, and yellow unit patterns Uy. All the unit patterns U of six colors are the unit patterns for detection U. The unit patterns U have luminance distributions. Luminance is the largest in the center in the direction along the epipolar lines Le1.

In FIG. 12, a rectangular range indicated by an alternate long and short dash line indicates the basic pattern group V. The basic pattern group V in this embodiment is a pattern group in which six unit patterns U are arranged in a row in the lateral direction. In the basic pattern group V, the unit patterns for detection U, one each of which are for each of the colors, are arranged in predetermined order. The pattern image Ip is an image including a plurality of basic pattern groups V. In other words, the pattern image Ip is a part of an image on which a plurality of the same basic pattern groups V are arrayed in the lateral direction.

In this embodiment, each positions where the luminance of the unit patterns U is the largest (maximum luminance positions) on a plurality of epipolar lines Le1 decided in advance are used as reference points. The reference points are arranged in a matrix shape in the pattern image Ip (the image forming region Ai). Coordinates of the reference points in the pattern image Ip are stored in the storing section 11 as reference coordinates. The epipolar lines Le2 on the captured image Ic corresponding to the epipolar lines Le1 can be determined in advance according to a disposition relation between the image projecting section 15 and the imaging section 16. Therefore, the detecting section 17 can detect, in the captured image Ic, as reference points (detected coordinates), maximum luminance positions of the unit patterns U on the epipolar lines Le2 determined in advance.

When detecting the reference points, the detecting section 17 generates identification information on the basis of the color of the detection target unit pattern U and outputs the identification information to the correction-information generating section 18 together with coordinates. Therefore, even when a part of the reference points are not detected because of unevenness (a step, etc.) of the projection surface Sp, the correction-information generating section 18 can estimate original positions (positions on the rectangular pattern image Ip) of the reference points based on the identification information. A corresponding relation between the reference coordinates and the detected coordinates is clarified. As a result, the correction-information generating section 18 can generate correction information using only a detected part of the reference points.

Note that the detecting section 17 may be configured to determine the maximum luminance positions on the basis of a rate of change (a gradient) of the luminance of regions around the maximum luminance positions. In this case, even when the maximum luminance positions are blocked by unevenness or the like of the projection surface Sp, it is possible to estimate the maximum luminance positions.

As explained above, with the projector 100 in this embodiment, as in the fourth and fifth embodiments, the detecting section 17 can detect the reference points along the epipolar lines Le2. Therefore, it is easy to detect the reference points.

With the projector 100 in this embodiment, as in the fifth embodiment, because the belt-like unit patterns U are arrayed in a row along the epipolar line Le1, it is possible to arrange the unit patterns U of the same color apart from one another in a direction along the epipolar line Le1. Therefore, the unit patterns U are prevented from being confused with the other unit patterns U.

With the projector 100 in this embodiment, because the reference points are detected on the basis of the luminance of the unit patterns U, it is possible to accurately detect the reference points. In particular, the projector 100 is effective when the end portions of the belt-like unit patterns U cannot be accurately detected as in the fifth embodiment because the spectral reflectance of the projection surface Sp is different depending on places and is affected by external light.

MODIFICATIONS

The embodiments may be changed as explained below.

In the first to sixth embodiments, the projector 100 integrally including the components such as the image projecting section 15 and the imaging section 16 is explained. However, a part or all of the components may be separated. When the image projecting section 15 and the imaging section 16 are separated, disposition states of the image projecting section 15 and the imaging section 16 change every time the projector 100 is set. Therefore, it is necessary to perform calibration (e.g., processing for associating coordinates on the rectangular pattern image Ip and coordinates on the captured image Ic) every time the projector 100 is set.

In the first to sixth embodiments, the distortion correction performed when a part of the reference points cannot be detected because of unevenness (a step, etc.) of the projection surface Sp having the three-dimensional shape is explained. However, the projection surface Sp is not limited to the three-dimensional shape. For example, the invention is also applicable when a part of the reference points cannot be detected because of a pattern or a stain present on a planar projection surface Sp, an obstacle, or the like.

In the first to sixth embodiments, the vertexes, end portions, or the maximum luminance positions of the unit patterns U are set as the reference points. However, the reference points are not limited to this. For example, the positions of the centers of gravity of the unit patterns U may be set as the reference points.

In the first, third, and fourth embodiments, the form is explained in which the unit patterns for detection U, one each of which is for each of the colors, are included in the basic pattern group V. However, a plurality of unit patterns of the same color may be included in the basic pattern group V if reference points can be identified. For example, if a combination of colors of a plurality of unit patterns for detection U surrounding one reference point (vertex) is differentiated at all the reference points in the basic pattern group V, even if the plurality of unit patterns of the same color are included, it is possible to identify the reference points.

In the sixth embodiment, a form may be adopted in which the reference points are specified by a phase shift method using the pattern image Ip, a luminance distribution of which in the direction along the epipolar lines Le1 is a sine wave over the plurality of unit patterns U. Specifically, the pattern image Ip (a first pattern image) having the luminance distribution of the sine wave described above is projected and captured and the luminance distribution is measured along the epipolar lines Le2 on the captured image Ic. At least two pattern images of a sine wave phase-shifted from the first pattern image are projected and luminance distributions are also measured for the respective pattern images along the epipolar lines Le2 on the captured image Ic. Reference points (e.g., maximum luminance positions on the first pattern image) may be specified on the basis of results of the measurement of the respective luminance distributions. With this form, even when the reflectance of the projection surface Sp is not uniform, it is possible to accurately detect the reference points.

In the first and third to sixth embodiments, the pattern image Ip includes the plurality of unit patterns U having the different colors. However, the difference of the colors is not limited to the difference of wavelength regions and may include a difference of brightness.

In the third to sixth embodiments, the maximum luminance positions of the unit patterns U are set as the reference points. However, positions where the luminance is the smallest in the unit patterns U (minimum luminance positions) may be set as the reference points.

In the fourth embodiment, the example of the pattern image Ip on which the plurality of unit patterns U having the different colors are arranged along the epipolar lines Le1 is explained. However, the pattern image Ip on which the plurality of unit patterns U having the different patterns in the second embodiment are arranged along the epipolar lines Le1 may be adopted.

In the first, fourth, and fifth embodiments, the pattern image Ip includes the black unit patterns Uk other than the unit patterns for detection U. However, a configuration not including the black unit patterns Uk is also possible. However, it is easier to detect the vertexes and the end portions of the unit patterns for detection U when the unit patterns for detection U and the black unit patterns Uk are arranged adjacent to each other as in the first, fourth, and fifth embodiments. The basic pattern group V can be increased in size by including the black unit patterns Uk in the pattern image Ip. Therefore, it is possible to arrange the unit patterns U of the same color apart from one another. The unit patterns U are prevented from being confused with the other unit patterns U.

In the fifth and sixth embodiments, each of the belt-like unit patterns U is configured by the single color over the entire region of the belt-like unit pattern U. However, it is also possible to adopt a form in which a plurality of regions having different colors are arrayed in the longitudinal direction (the direction crossing the epipolar lines Le1).

In the first to sixth embodiments, when a part of an image projected from the projector 100 is blocked by unevenness of the projection surface Sp and a shadow is formed, it is also possible to cause a plurality of projectors 100 to respectively project the image from different directions to prevent a region where the image is not displayed (a region where a shadow is formed) from being generated.

In the first to sixth embodiments, the liquid crystal light valves 22R, 22G, and 22B of the transmission type are used as the light modulating devices. However, it is also possible to use a light modulating device of a reflection type such as a liquid crystal light valve of the reflection type. It is also possible to use a digital mirror device or the like that modulates light emitted from the light source 21 by controlling an emitting direction of incident light for each of micromirrors functioning as pixels. The invention is not limited to a configuration including a plurality of light modulating devices for respective color lights and may be a configuration for modulating a plurality of color lights with one light modulating device in a time-division manner.

The entire disclosure of Japanese Patent Application No. 2017-168291, filed on Sep. 1, 2017 is expressly incorporated by reference herein.

What is claimed is:

1. An image projection system comprising:
a projection lens configured to project an image onto a projection surface;
a controller configured to cause the projection lens to project a pattern image;
a sensor configured to capture the pattern image projected on the projection surface; and
at least one processor programmed to:
detect reference points on the basis of the pattern image captured by the sensor;
select between correcting the image based upon positions of all reference points and based upon positions of only the reference points that are detected; and
correct the image based upon the selected correcting, the correcting including correcting the image projected by the projection lens for distortions caused by three-dimensional unevenness on the projection surface
wherein
the pattern image includes a plurality of unit patterns for specifying the reference points,
the unit patterns are patterns of a shape having vertexes, each of the reference points corresponding to each of the vertexes of the unit patterns,
the plurality of unit patterns includes at least a first unit pattern, a second unit pattern and a third unit pattern,
the first unit pattern has a first color,
the second unit pattern has a second color,
the third unit pattern has a third color, and
the first color, the second color and the third color are different from each other.

2. The image projection system according to claim 1, wherein
the at least one processor is programmed to detect the vertexes of the unit patterns as the reference points.

3. The image projection system according to claim 1, wherein
the unit patterns are patterns having luminance distributions, and
the at least one processor is programmed to detect the reference points on the basis of luminance of the unit patterns.

4. The image projection system according to claim 1, wherein the pattern image includes a plurality of basic pattern groups in which the at least three types unit patterns are arranged in a predetermined array.

5. The image projection system according to claim 1, wherein
in the pattern image, the unit patterns are arranged such that the reference points are located along a first epipolar line determined on the basis of a disposition relation between the projection lens and the sensor, and
the at least one processor is programmed to detect, from the image captured by the sensor, the reference points along a second epipolar line corresponding to the first epipolar line.

6. The image projection system according to claim 1, wherein
the unit patterns are belt-like patterns extending in a direction crossing a first epipolar line determined on the basis of a disposition relation between projecting lens and the sensor, and
the at least one processor is programmed to detect, from the image captured by the sensor, the reference points along a second epipolar line corresponding to the first epipolar line.

7. The image projection system according to claim 6, wherein the at least one processor is programmed to detect end portions of the unit patterns as the reference points.

8. The image projection system according to claim 6, wherein
the unit patterns are patterns having luminance distributions, and
the at least one processor is programmed to detect the reference points on the basis of luminance of the unit patterns.

9. The image projection system according to claim 1, wherein the projection lens and the sensor are integrally configured.

10. The image projection system according to claim 1, wherein the at least one processor is programmed to divide the image into two and deform the image in block units when a column of the reference points is not detected.

11. The image projection system according to claim 10, wherein the at least one processor is programmed to allocate a part of the image to a columnar correction region sandwiched between a first correction region and a second correction region, each of the first and the second correction regions being formed by the block units of a shape with which distortion of the plurality of unit patterns is offset.

12. A control method for an image projection system comprising:
projecting a pattern image from a projection lens configured to project an image onto a projection surface;
capturing, with a sensor, the pattern image projected on the projection surface;
detecting, by at least one processor, reference points on the basis of the captured pattern image;
selecting, by the at least one processor, between correcting the image based upon positions of all reference points and based upon positions of only the reference points that are detected by the detecting; and
correcting the image based upon the selected correcting, by the at least one processor, the image projected by the projection lens for distortions caused by three-dimensional unevenness on the projection surface, wherein
the pattern image includes a plurality of unit patterns for specifying the reference points,
the unit patterns are patterns of a shape having vertexes, each of the reference points corresponding to each of the vertexes of the unit patterns,
the plurality of unit patterns includes at least a first unit pattern, a second unit pattern, and a third unit pattern,
the first unit pattern has a first color,
the second unit pattern has a second color,
the third unit pattern has a third color, and
the first color, the second color, and the third color are different from each other.

* * * * *